US012801271B2

(12) United States Patent
Wang et al.

(10) Patent No.: US 12,801,271 B2
(45) Date of Patent: Nov. 17, 2026

(54) METHOD AND APPARATUS FOR DISPLAYING APPLICATION, MEDIUM, IN-VEHICLE TERMINAL, AND VEHICLE

(71) Applicant: Xiaomi EV Technology Co., Ltd., Beijing (CN)

(72) Inventors: Ying Wang, Beijing (CN); Luoshanzhu Li, Beijing (CN); Zhenshuo Fang, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 295 days.

(21) Appl. No.: 18/816,186

(22) Filed: Aug. 27, 2024

(65) Prior Publication Data

US 2025/0217019 A1 Jul. 3, 2025

(30) Foreign Application Priority Data

Dec. 28, 2023 (CN) ......................... 202311840426.3

(51) Int. Cl.
*G06F 3/048* (2013.01)
*G06F 3/0481* (2022.01)
*G06F 3/04845* (2022.01)

(52) U.S. Cl.
CPC ........ *G06F 3/04845* (2013.01); *G06F 3/0481* (2013.01)

(58) Field of Classification Search
CPC ........................... G06F 3/04845; G06F 3/0451
See application file for complete search history.

(56) References Cited

U.S. PATENT DOCUMENTS 9,268,518 B2 * 2/2016 Reeves .............. H04N 21/4126
10,620,774 B2 * 4/2020 Jeong .................... G06F 3/0481
10,739,987 B2 * 8/2020 Hwang ............... G06F 3/04817
(Continued)

FOREIGN PATENT DOCUMENTS

CN 104238949 A 12/2014
CN 107690612 A 2/2018
(Continued)

OTHER PUBLICATIONS

Cohen et al., Constraint-Based Tiled Windows, May 1986, IEEE, 11 pages (Year: 1986).*
(Continued)

*Primary Examiner* — Linh K Pham
(74) *Attorney, Agent, or Firm* — Volpe Koenig

(57) ABSTRACT

A method, performed by an in-vehicle terminal, including: receiving an application window editing operation for a current display interface; and adjusting an application window layout of the current display interface according to the application window editing operation and a window queue. The window queue is configured for continuous adjacent arrangement of n application windows in the current display interface, and a status of the window queue is dynamically updated with change of the application window layout, serial numbers of application windows in the window queue sequentially increase in a direction opposite to a starting point direction. At least part of a zone of the window queue overlaps a display interface of an in-vehicle terminal, so as to ensure that the application windows in the window queue are displayed in the current display interface.

18 Claims, 15 Drawing Sheets

(56) References Cited

U.S. PATENT DOCUMENTS

| | | | | |
|---|---|---|---|---|
| 11,880,555 | B2 * | 1/2024 | Ezaki | G06F 3/04817 |
| 12,386,498 | B2 * | 8/2025 | Jung | G06F 1/1616 |
| 12,508,907 | B2 * | 12/2025 | Wang | B60K 35/22 |
| 12,534,092 | B2 * | 1/2026 | Shivaprasad | B60W 50/082 |
| 12,548,351 | B2 * | 2/2026 | Cho | G06V 20/588 |
| 2014/0089833 | A1 * | 3/2014 | Hwang | G06F 3/04817 715/780 |
| 2014/0245203 | A1 * | 8/2014 | Lee | G06F 3/04845 715/765 |
| 2015/0046871 | A1 * | 2/2015 | Lewis | G06F 3/04883 715/798 |
| 2015/0121229 | A1 * | 4/2015 | Wang | G06F 3/04886 715/728 |
| 2016/0144714 | A1 | 5/2016 | Kim | |
| 2017/0010766 | A1 | 1/2017 | Nakashima | |
| 2017/0188213 | A1 * | 6/2017 | Nirantar | G06F 16/144 |
| 2017/0212633 | A1 | 7/2017 | You et al. | |
| 2017/0262158 | A1 | 9/2017 | Webb | |
| 2019/0324603 | A1 * | 10/2019 | Shin | G06F 3/04886 |
| 2020/0133487 | A1 * | 4/2020 | Zhang | G06F 3/04817 |
| 2020/0241290 | A1 * | 7/2020 | Breese | G02B 27/0081 |
| 2021/0014591 | A1 * | 1/2021 | Kim | G06F 3/167 |
| 2021/0383373 | A1 * | 12/2021 | Eirinberg | G06Q 20/3821 |
| 2022/0219539 | A1 | 7/2022 | Helot et al. | |
| 2022/0247857 | A1 * | 8/2022 | Wang | G06F 3/0488 |
| 2023/0082360 | A1 * | 3/2023 | Shen | G06F 3/0483 715/764 |
| 2023/0393700 | A1 | 12/2023 | Louch et al. | |
| 2023/0418446 | A1 * | 12/2023 | Peng | G06F 3/04845 |
| 2024/0184504 | A1 * | 6/2024 | Gao | G06F 9/451 |
| 2024/0211815 | A1 * | 6/2024 | Kumari | G06N 5/01 |
| 2024/0246412 | A1 * | 7/2024 | Hanson, II | B60K 35/00 |
| 2024/0293867 | A1 * | 9/2024 | Gan | B22F 10/85 |
| 2025/0130825 | A1 * | 4/2025 | Liu | G06F 3/0484 |
| 2025/0214429 | A1 * | 7/2025 | Wang | B60K 35/22 |

FOREIGN PATENT DOCUMENTS

| | | | | |
|---|---|---|---|---|
| CN | 110727382 | A * | 1/2020 | G06F 3/04842 |
| CN | 115617225 | A * | 1/2023 | G06F 3/04883 |
| CN | 116185318 | A | 5/2023 | |
| CN | 117093290 | A | 11/2023 | |
| EP | 4257403 | A1 * | 10/2023 | B60K 35/81 |
| EP | 4257403 | B1 | 10/2023 | |
| WO | 2021227770 | A1 | 11/2021 | |

OTHER PUBLICATIONS

Kustanowits et al., Hierarchical Layout for Photo Libraries, 2006, IEEE, 11 pages (Year: 2006).*

* cited by examiner

1610

1620

METHOD AND APPARATUS FOR DISPLAYING APPLICATION, MEDIUM, IN-VEHICLE TERMINAL, AND VEHICLE

CROSS-REFERENCE TO RELATED APPLICATIONS

The present application claims the benefit of priority to Chinese Application No. 202311840426.3, filed on Dec. 28, 2023, the contents of which are incorporated herein by reference in their entireties for all purposes.

BACKGROUND OF THE INVENTION

Vehicles as a means of transportation, have been widely used in daily life, work and tourism. In the related art, an in-vehicle display screen is located on a control panel at a front end inside a vehicle, and is configured to provide functions such as audio and video playback and vehicle navigation.

SUMMARY OF THE INVENTION

The disclosure relates to the field of electronic technologies, and particularly relates to a method and apparatus for displaying an application, a medium, an in-vehicle terminal, and a vehicle.

According to a first aspect of an example of the disclosure, a method for displaying an application is provided. The method is performed by an in-vehicle terminal. A current display interface of the in-vehicle terminal includes n application windows, where n≥1. In response to determining n>1, the n application windows are arranged adjacent to each other in a transverse direction.

The method includes:

receiving an application window editing operation for the current display interface; and adjusting an application window layout of the current display interface according to the application window editing operation and a window queue.

The window queue is configured for continuous adjacent arrangement of the n application windows. A status of the window queue is dynamically updated with change of the application window layout. Serial numbers of the application windows in the window queue sequentially increase in a direction opposite to a starting point direction. A serial number of the application window, closest to the starting point direction, of the n application windows is 1. The starting point direction is a direction, close to a driver side, of the in-vehicle terminal.

At least part of a zone of the window queue overlaps a display interface of the in-vehicle terminal, so as to ensure that the application windows in the window queue are displayed in the current display interface.

According to a second aspect of an example of the disclosure, a non-transitory computer-readable storage medium is provided. The computer-readable storage medium stores a computer program instruction. one or more processors are collectively configured to execute the computer program instruction to:

receive an application window editing operation for the current display interface; and adjust an application window layout of the current display interface according to the application window editing operation and a window queue;

the window queue is configured for continuous adjacent arrangement of the n application windows, a status of the window queue is dynamically updated with change of the application window layout, serial numbers of application windows in the window queue sequentially increase in a direction opposite to a starting point direction, a serial number of an application window, closest to the starting point direction, of the n application windows is 1, and the starting point direction is a direction, close to a driver side, of the in-vehicle terminal; and at least part of a zone of the window queue overlaps a display interface of the in-vehicle terminal, so as to ensure that application windows in the window queue are displayed in the current display interface.

According to a third aspect of an example of the disclosure, an in-vehicle terminal is provided. The in-vehicle terminal includes:

one or more processors; and a memory configured to store an instruction executable by the one or more processors.

The one or more processors are collectively configured to execute the executable instruction in the memory to:

receive an application window editing operation for the current display interface; and adjust an application window layout of the current display interface according to the application window editing operation and a window queue;

the window queue is configured for continuous adjacent arrangement of the n application windows, a status of the window queue is dynamically updated with change of the application window layout, serial numbers of application windows in the window queue sequentially increase in a direction opposite to a starting point direction, a serial number of an application window, closest to the starting point direction, of the n application windows is 1, and the starting point direction is a direction, close to a driver side, of the in-vehicle terminal; and at least part of a zone of the window queue overlaps a display interface of the in-vehicle terminal, so as to ensure that application windows in the window queue are displayed in the current display interface.

According to a fourth aspect of an example of the disclosure, a vehicle is provided. The vehicle includes the in-vehicle terminal according to the third aspect of the disclosure.

It is to be understood that the above general description and the following detailed description are illustrative and explanatory, and cannot limit the disclosure.

BRIEF DESCRIPTION OF DRAWINGS

Accompanying drawings here are incorporated in the description as a constituent part of the description, illustrate examples conforming to the disclosure, and serve to describe principles of the disclosure together with the description.

DETAILED DESCRIPTION

Examples will be described in detail here and shown in the accompanying drawings illustratively. When the following descriptions involve the accompanying drawings, unless otherwise specified, the same number in different accompanying drawings denotes the same or similar elements. The embodiments described in the following examples do not denote all embodiments consistent with the disclosure. On the contrary, the embodiments are merely instances of an apparatus and a method consistent with some aspects of the disclosure as detailed in the appended claims.

It is to be noted that all actions of obtaining signals, information or data in the disclosure are conducted under the premise of complying with corresponding data protection laws and policies of the current country and obtaining authorization from a corresponding apparatus owner.

With the technology development, an existing in-vehicle display screen has a function of split-screen display. An existing split-screen principle is to divide the entire display screen into different display zones by dividing pixel points on the display screen, and thus different application content can be displayed in the display zones respectively. However, a size and content of each display zone are generally fixed, which can hardly satisfy customized demand of users.

In order to solve the problems in the related art, the disclosure provides a method and apparatus for displaying an application, a medium, an in-vehicle terminal, and a vehicle.

Figure 1:
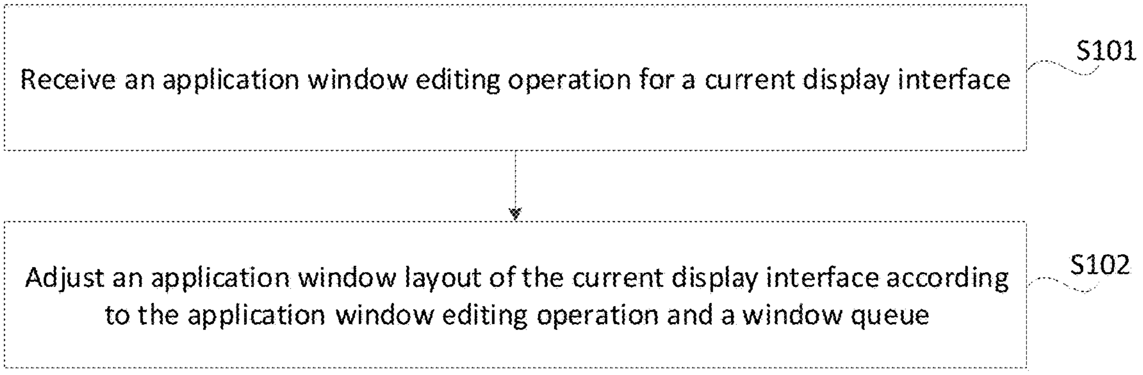
FIG. 1 is a flow diagram of a method for displaying an application according to an example.

FIG. 1 is a flow diagram of a method for displaying an application according to an example. The method may be performed by an in-vehicle terminal. For instance, the in-vehicle terminal may be a smart phone, an intelligent wearable device, an in-vehicle terminal, etc. As shown in FIG. 1, the method for displaying an application may include S101 and S102.

In S101, an application window editing operation for a current display interface is received.

In the disclosure, the current display interface of the in-vehicle terminal includes n application windows. In response to determining that n>1, that is, the current display interface includes a plurality of application windows, the n application windows are arranged adjacent to each other in a transverse direction, that is, no gap is provided between the n application windows. In addition, the application windows are not in a cross-screen mode, and different application windows are configured to display different applications.

Figure 2A:
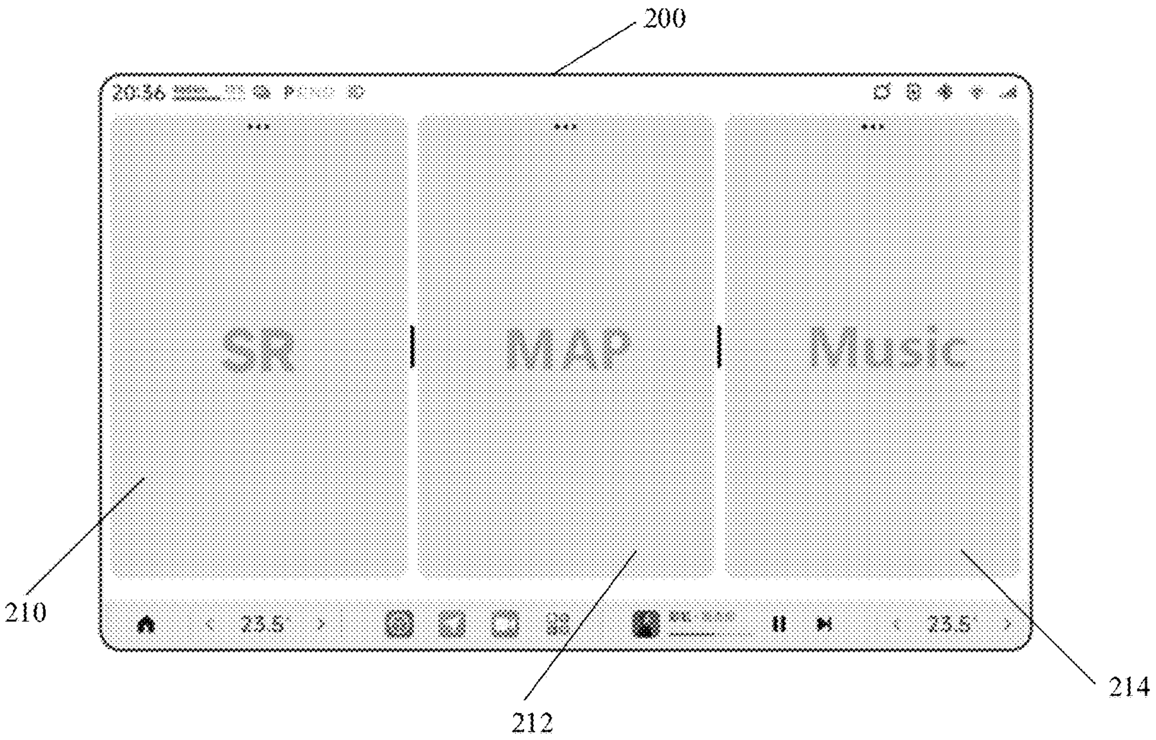
FIG. 2A is a schematic diagram of a current display interface according to an example.

As shown in FIG. 2A, the current display interface 200 of the in-vehicle terminal includes three application windows (referred to as window 1 210, window 2 212 and window 3 214 from left to right) that are arranged adjacent to each other in the transverse direction. The window 1 210 is configured to display substitutional reality (SR). The window 2 212 is configured to display a map. The window 3 214 is configured to display music. The SR is virtual road condition information of a current position of a vehicle.

In addition, as shown in FIG. 2A, a display interface of the in-vehicle terminal includes a status bar located on a top of the display interface, an application startup bar located on a bottom of the display interface, and an effective zone located between the status bar and the application startup bar. The effective zone is configured to display the application window.

The application window editing operation may be a window removing operation, a window width adjusting operation, a window adding operation, a window full-screen display operation, and a window translating operation, etc.

In S102, an application window layout of the current display interface is adjusted according to the application window editing operation and a window queue.

In the disclosure, the window queue is configured for continuous adjacent arrangement of the n application windows in the current display interface. At least part of a zone of the window queue overlaps the display interface of the in-vehicle terminal, so as to ensure that the application windows in the window queue are displayed in the current display interface. That is, the display interface of the in-vehicle terminal is configured to display the application window in the window queue, and the n application windows are continuous in the window queue.

In addition, a status of the window queue is dynamically updated with change of the application window layout. The status of the window queue includes a length (that is, n) of the window queue and a window width. That is, through adjustment of a display interface layout in the in-vehicle terminal may lead to change of the length of the window queue and the application window width in the window queue. Serial numbers of the application windows in the window queue sequentially increase in a direction opposite to a starting point direction. A serial number of the application window, closest to the starting point direction, of the n application windows is 1. The starting point direction is a direction, close to a driver side, of the in-vehicle terminal. If the vehicle is a left-rudder vehicle, the starting point direction is horizontally leftward. If the vehicle is a right-rudder vehicle, the starting point direction is horizontally rightward. The drawings in the disclosure all take the condition that the vehicle is the left-rudder vehicle as an instance.

The application window layout may include display content (that is, which applications are displayed) and/or the window width. That is, the step that the application window layout of the current display interface is adjusted includes the following step that the display content of the current display interface is adjusted and/or the window width of the current display interface is adjusted. Adjustment of the window width and adjustment of the display content may lead to change of a number of windows in the current display interface.

The technical solution according to the examples of the disclosure can have the following beneficial effects: the in-vehicle terminal adjusts, in response to receiving the application window editing operation for the current display interface, the application window layout of the current display interface according to the application window editing operation and the window queue. The window queue is configured for continuous adjacent arrangement of the n application windows in the current display interface. The status of the window queue is dynamically updated with change of the application window layout of the current display interface. The at least part of the zone of the window queue overlaps the display interface of the in-vehicle terminal, so as to ensure that the application windows in the window queue are displayed in the current display interface. In this way, self-adaptive adjustment of display content and a display window size in the display interface can be implemented according to a user operation, and a use experience of a user can be improved. In addition, one or more application windows can be displayed in the display interface of the in-vehicle terminal, such that the display interface can have more display forms, and a use ratio of the display interface and a visual experience of the user can be improved. In addition, when split-screen display is conducted in the display interface, different applications can be separately displayed in each display window, which facilitates use.

In the disclosure, n≤3, and the application window width is d/3 or 2d/3. That is, the application window in the window queue and the application window in the current display interface have two sizes of d/3 and 2d/3. The application window width changes adaptively with layout change of the display interface, where d denotes a width of the current display interface.

Figure 11A:
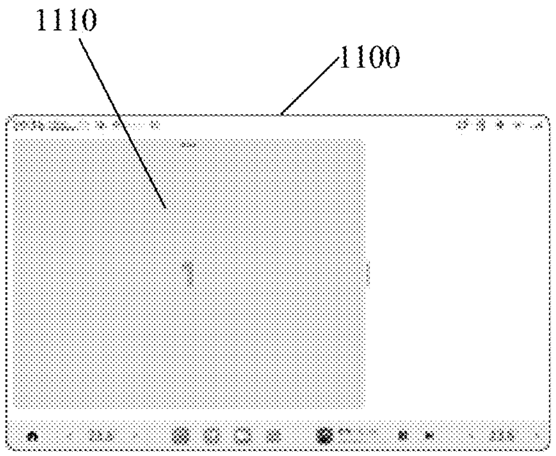
FIG. 11A is a schematic diagram of a current display interface according to yet another example.
Figure 11B:
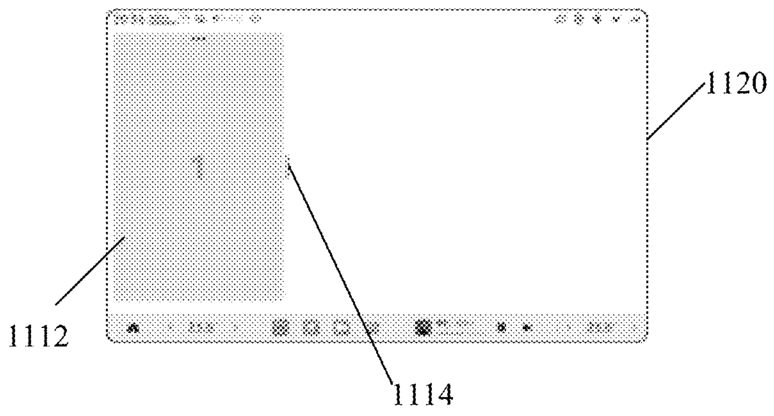
FIG. 11B is a schematic diagram of a current display interface according to still another example.

In one embodiment, the current display interface includes one application window. A width of the application window may be 2d/3 (as shown in FIG. 11A) or d/3 (as shown in FIG. 11B). In this case, a vacant window position away from the starting point direction exists in the current display interface, and a width of the vacant window position is (d−d1), where d1 denotes a width of the above application window.

Figure 10A:
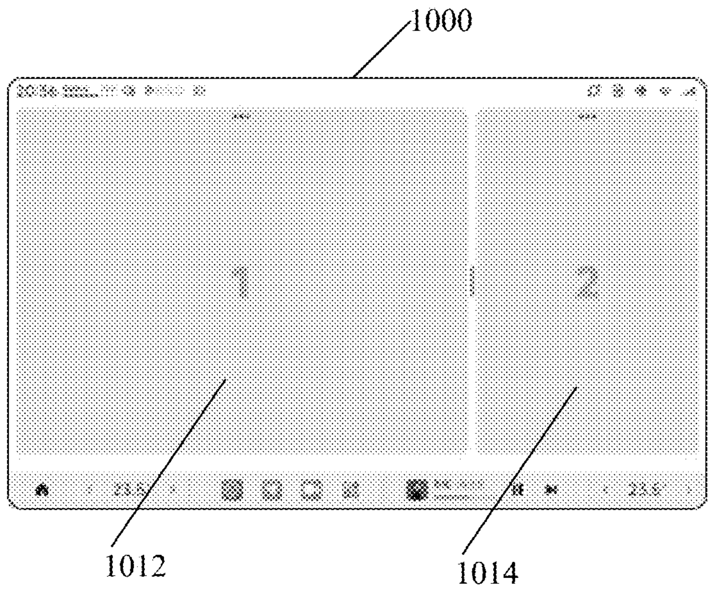
FIG. 10A is a schematic diagram of a current display interface according to yet another example.
Figure 10B:
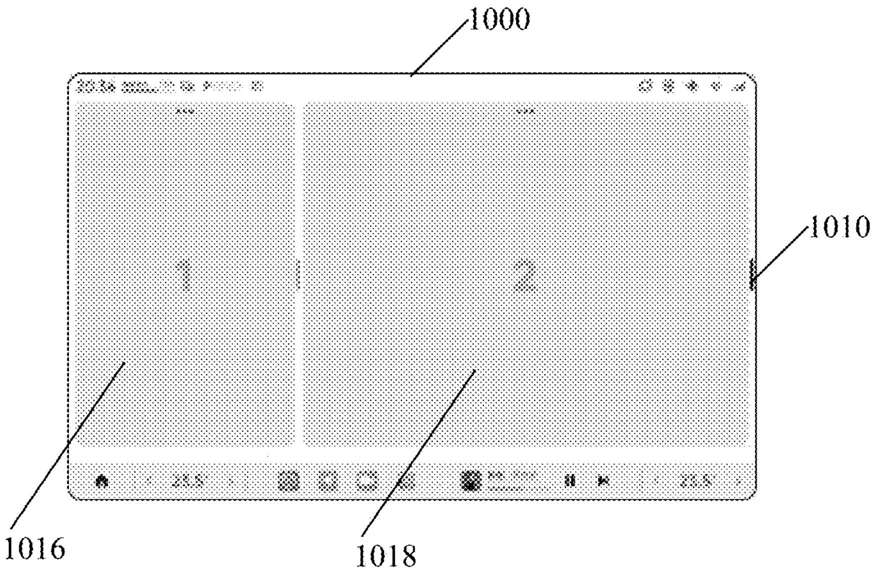
FIG. 10B is a schematic diagram of a current display interface according to yet another example.
Figure 10C:
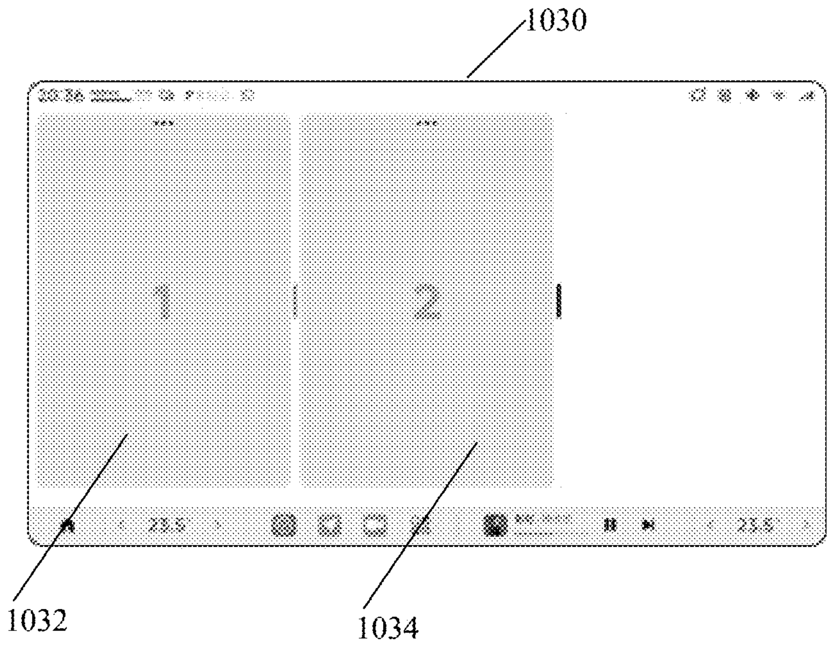
FIG. 10C is a schematic diagram of a current display interface according to yet another example.

In another embodiment, the current display interface includes two application windows. Widths of the two application windows may be both d/3 (as shown in FIG. 10C). In this case, a vacant window position away from the starting point direction exists in the current display interface, and a width of the vacant window position is d/3.

In yet another embodiment, the current display interface includes two application windows. Widths of the two application windows may be d/3 and 2d/3 respectively, and no vacant window position exists in the current display interface. The application window with the width of d/3 may be close to the starting point direction (as shown in FIG. 10A) or away from the starting point direction (as shown in FIG. 10B).

In yet another embodiment, as shown in FIG. 2A, the current display interface includes three application windows. Widths of the three application windows may be all d/3. In this case, no vacant window position exists in the current display interface.

Figure 2B:
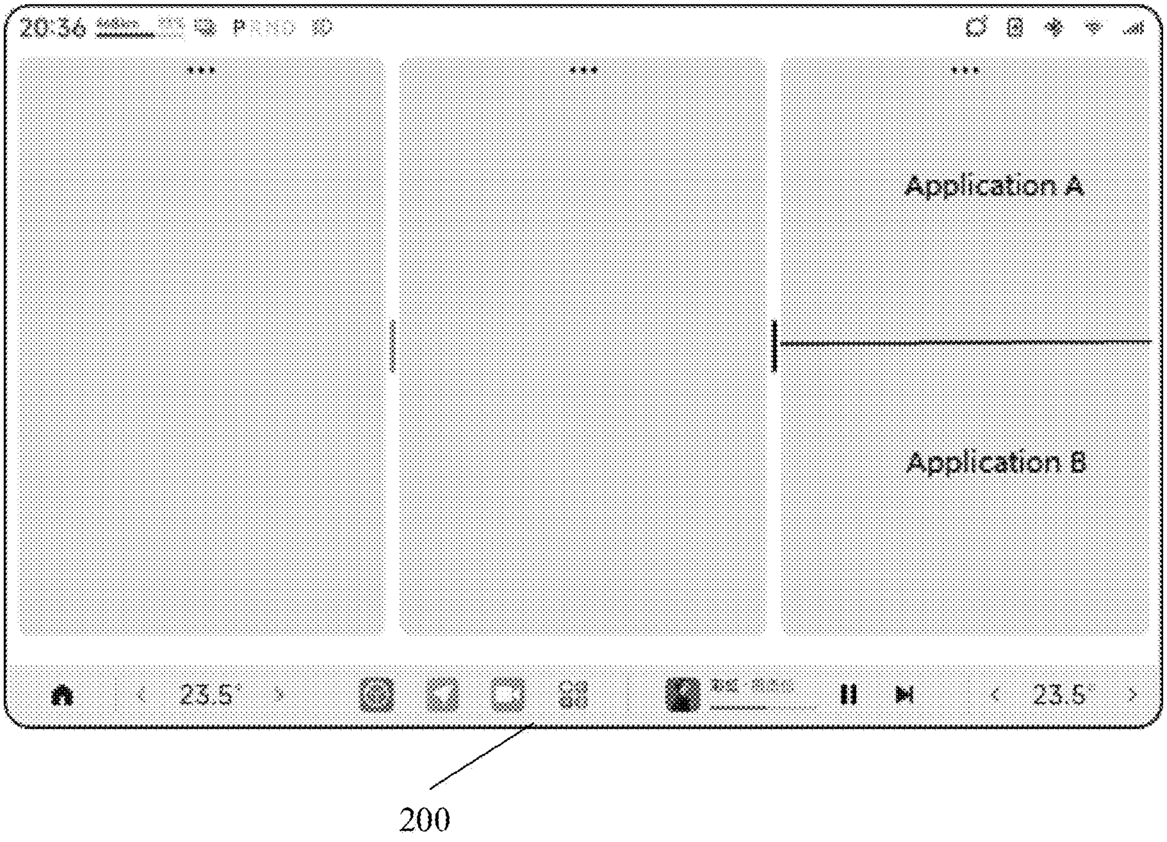
FIG. 2B is a schematic diagram of a current display interface according to another example.

In yet another embodiment, as shown in FIG. 2B, the current display interface 200 includes n application windows. An nth application window in the current display interface includes two or more different application interfaces. In this case, no vacant window position exists in the current display interface.

The specific embodiment of the step that the application window layout of the current display interface is adjusted according to the application window editing operation and the window queue in S102 will be described in detail below. In the disclosure, the application window layout may be adjusted on the basis that a number of application windows adjusted is as small as possible, such that influence of adjustment of the application window layout on the window queue can be reduced while adjustment efficiency of the application window layout can be improved.

Specifically, in response to determining that the application window editing operation is the window removing operation, the application window layout of the current display interface may be adjusted according to the application window editing operation and the window queue through the following steps (a1)-(a5):

Step (a1): a to-be-removed window is determined in the current display interface according to the window removing operation.

Figure 3A:
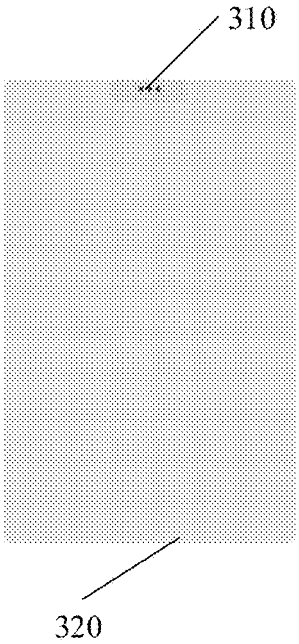
FIG. 3A is a schematic diagram of a window control according to an example.
Figure 3B:
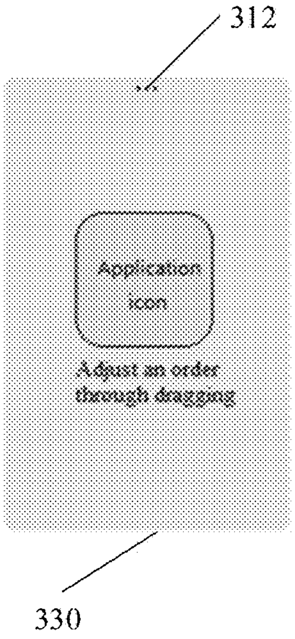
FIG. 3B is a schematic diagram of moving an application window according to an example.

In the disclosure, the current display interface 200 further includes a window control 310, 312 (three points on the top of the application window as shown in FIGS. 3A and 3B, respectively) configured on a top of each application window, 320, 330. A user may move, remove and full-screen display the application window where the window control is located through the window control. That is, the user may trigger operations such as window removal, window full-screen display and window movement through the window control.

In one embodiment, as shown in FIG. 3B, the user enables an application window 330 to be in a movable status by long-pressing a window control on a top of the corresponding application window, and then the user adjusts a display position of the application window in the current display interface by dragging the corresponding application window.

Figure 3C:
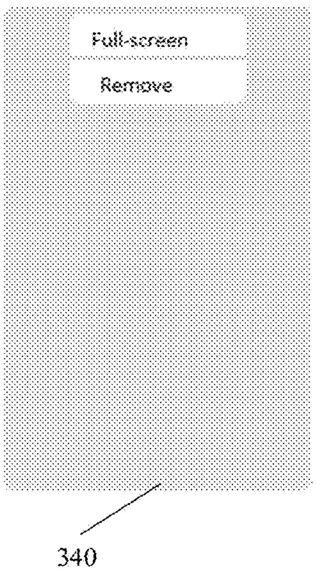
FIG. 3C is a schematic diagram of a menu of full-screen displaying and removing an application window according to an example.

In another embodiment, as shown in FIG. 3C, the user enables an application window 340 to display a menu by clicking on the window control on the top of the corresponding application window. The menu includes two options of “full screen” and “remove”. The user implements window editing by selecting a corresponding option through a clicking operation. Specifically, when the user selects the “full screen” option, the current display interface displays the application window in a full-screen mode. When the user selects the “remove” option, the application window is removed from the current display interface.

Step (a2): a to-be-removed window n is removed from the current display interface.

Step (a3): whether an (n+1)th application window exists is determined.

Step (a4): in response to determining that the (n+1)th application window exists, an application window having a serial number greater than that of the to-be-removed window n in the window queue is translated sequentially to the starting point direction, and is displayed in the current display interface.

In response to determining that the (n+1)th application window does not exist, it is indicated that the current display interface includes an end window of the window queue, that is, no application window that may be added to a freed-up vacant window position in the current display interface exists in the window queue. In this case, adjustment of the display content of the current display interface is completed.

Step (a5): in response to determining that n=1 and a to-be-removed window is not located at a starting point of the window queue, the current display interface is switched to a display interface previous to the current display interface.

In the disclosure, the application windows in the window queue constitute a plurality of continuous display interfaces, the previous display interface is an interface, close to the starting point direction, of adjacent interfaces of the current display interface, and a subsequent display interface is an interface, away from the starting point direction, of adjacent interfaces of the current display interface.

When the number of application windows in the current display interface is 1 and the to-be-removed window is not located at the starting point of the window queue, it is indicated that the application window in the current display interface is the to-be-removed window and the current display interface further has the previous display interface. In this case, a display interface of a display device may be switched from the current display interface to the display interface previous to the current display interface.

The specific embodiment of the steps that the application window having the serial number greater than that of the to-be-removed window n in the window queue is translated sequentially to the starting point direction and is displayed in the current display interface in step (a4) will be described in detail below. Specifically, the specific embodiment may be implemented through the following steps (a41) and (a42):

Step (a41): a first width of the (n+1)th application window and a second width of the to-be-removed window are obtained.

Step (a42): a translating strategy is determined according to a comparison result of the first width and the second width.

Then, the application window having the serial number greater than that of the to-be-removed window n in the window queue may be translated sequentially to the starting point direction according to the translating strategy.

The specific embodiment of the step that the translating strategy is determined according to the comparison result of the first width and the second width in step (a42) will be described in detail below.

In one embodiment, in response to determining that the first width of the (n+1)th application window is greater than the second width of the to-be-removed window, the translating strategy is to reduce the first width of the (n+1)th application window to the second width of the to-be-removed window, translate the (n+1)th application window to the starting point direction, and display the (n+1)th application window in the current display interface.

Figure 4:
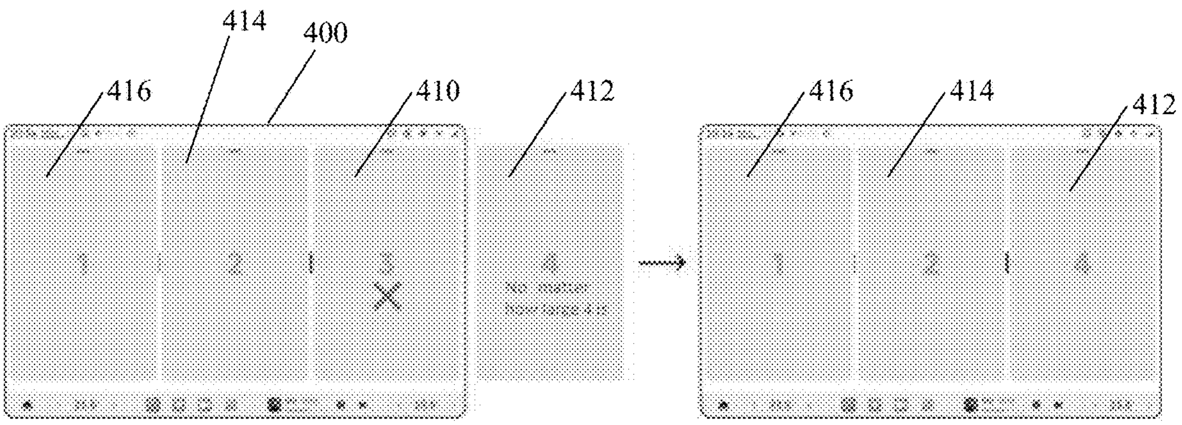
FIG. 4 is a schematic diagram of removing an application window according to an example.

For instance, as shown in FIG. 4, n=3, and the current display interface 400 includes three application windows each with a width of d/3. Accordingly, the width of the to-be-removed window is also d/3, where the to-be-removed window is the window 3 410. If a first width of a fourth application window (that is, window 4, 412) is 2d/3, which is greater than the second width of the to-be-removed window, the translating strategy is to reduce the first width of the window 4 to d/3, translate the window 4 to the starting point direction, and display the window 4 in the current display interface.

Figure 5:
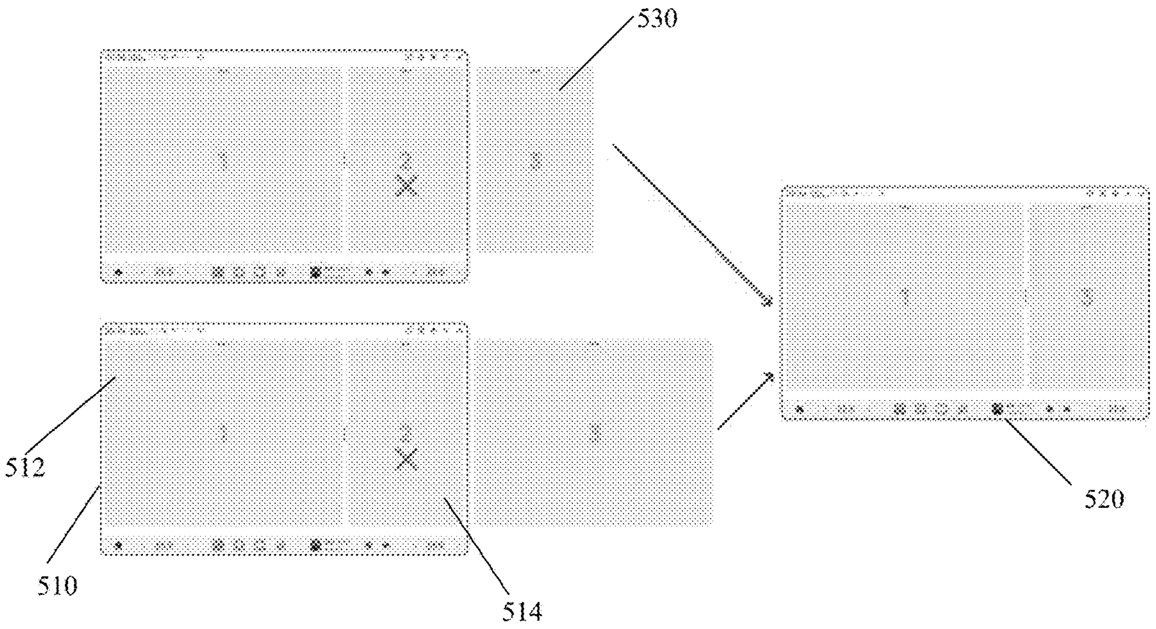
FIG. 5 is a schematic diagram of removing an application window according to another example.

Further, for instance, as shown in the current display interface 510 at a left bottom in FIG. 5, n=2, and the current display interface includes two application windows. A width of the application window 512 close to the starting point direction is 2d/3, and a width of an application window 514 away from the starting point direction is d/3. The to-be-removed window is the window 2. A width of a third application window (that is, window 3) is 2d/3, which is greater than the width of the to-be-removed window. In this case, the translating strategy is to reduce the width of the window 3 530 to d/3, translate the window 3 to the starting point direction, and display the window 3 in the current display interface 520.

In another embodiment, in response to determining that the first width of the (n+1)th application window is equal to the second width of the to-be-removed window, the translating strategy is to keep a width of the (n+1)th application window unchanged, translate the (n+1)th application window to the starting point direction, and display the (n+1)th application window in the current display interface.

For instance, as shown in FIG. 4, n=3, and the current display interface includes three application windows 410, 414, 416 each with a width of d/3. Accordingly, the width of the to-be-removed window is also d/3, where the to-be-removed window is the window 3. If a first width of a fourth application window (window 4) is d/3, which is equal to the second width of the to-be-removed window, the translating strategy is to keep the width of the window 4 unchanged, translate the window 4 to the starting point direction, and display the window 4 in the current display interface.

Further, for instance, as shown in the current display interface at a left top in FIG. 5, n=2, and the current display interface includes two application windows. A width of the application window close to the starting point direction is 2d/3, and a width of an application window away from the starting point direction is d/3. The to-be-removed window is the window 2. A width of a third application window (that is, window 3) is d/3, which is equal to the width of the to-be-removed window. In this case, the translating strategy is to keep the width of the window 3 unchanged, translate the window 3 to the starting point direction, and display the window 3 in the current display interface.

Figure 6:
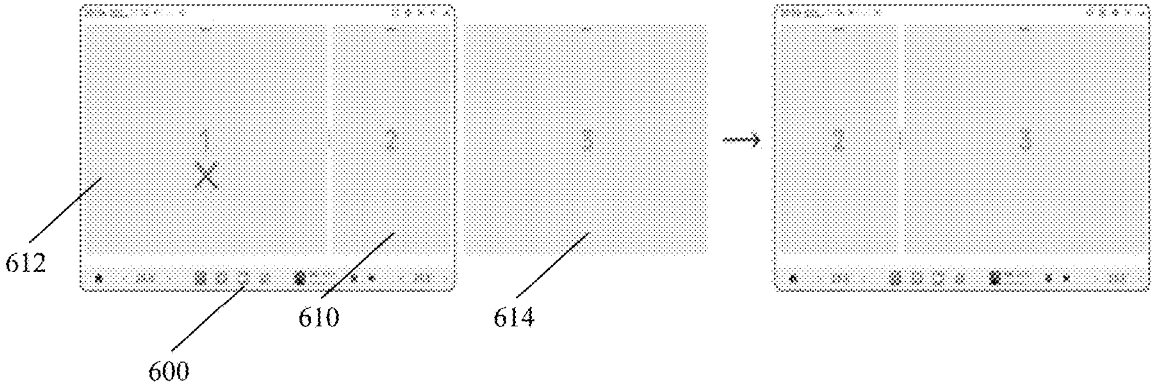
FIG. 6 is a schematic diagram of removing an application window according to yet another example.

Further, for instance, as shown in FIG. 6, n=2, and the current display interface 600 includes two application windows 610, 612. A width of the application window 612 close to the starting point direction is 2d/3, and a width of an application window 610 away from the starting point direction is d/3. The to-be-removed window is the window 1 with a width of 2d/3. A width of a third application window 614 (that is, window 3) is 2d/3, which is equal to the width of the to-be-removed window. In this case, the translating strategy is to keep the width of the window 3 unchanged, translate the window 3 to the starting point direction, and display the window 3 in the current display interface.

In yet another embodiment, in response to determining that the first width of the (n+1)th application window is smaller than the second width of the to-be-removed window and an (n+2)th application window exists, the translating strategy is to keep a width of the (n+1)th application window unchanged, translate the (n+1)th application window to the starting point direction, and display the (n+1)th application window in the current display interface; and translate the (n+2)th application window with a width equaling a difference between the second width and the first width to the starting point direction, and display the (n+2)th application window in the current display interface. No matter how wide the (n+2)th application window is, the (n+2)th application window is translated to the starting point direction by a width equaling the difference between the second width and the first width, and is displayed in the current display interface.

Figure 7:
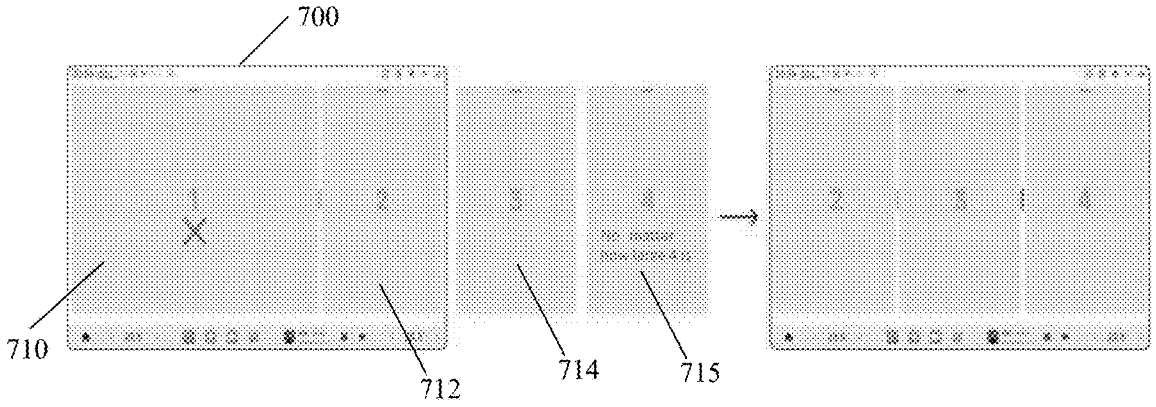
FIG. 7 is a schematic diagram of removing an application window according to still another example.

For instance, as shown in FIG. 7, the current display interface 700 includes two application windows 710, 712. A width of the application window 710 close to the starting point direction is 2d/3, and a width of an application window 712 away from the starting point direction is d/3. The to-be-removed window is the window 1 with a width of 2d/3. A width of a third application window (that is, window 3 714) is d/3, which is smaller than the width of the to-be-removed window. Moreover, a fourth application window (that is, window 4 715) exists. In this case, the translating strategy is to keep the width of the window 3 unchanged, translate the window 3 to the starting point direction, and display the window 3 in the current display interface; and translate the window 4 with a width (that is, d/3) equaling a difference between the second width and the first width to the starting point direction, and display the window 4 in the current display interface. No matter how wide the window 4 is, the window 4 is translated to the starting point direction by a width of d/3, and is displayed in the current display interface.

In yet another embodiment, in response to determining that the first width of the (n+1)th application window is smaller than the second width of the to-be-removed window and the (n+2)th application window does not exist, the translating strategy is to keep a width of the (n+1)th application window unchanged, translate the (n+1)th application window to the starting point direction, and display the (n+1)th application window in the current display interface.

In the disclosure, in response to determining that the first width of the (n+1)th application window is smaller than the second width of the to-be-removed window and the (n+2)th application window does not exist, a width of the (n+1)th application window may be kept unchanged, and the (n+1)th application window may be translated to the starting point direction and displayed in the current display interface. Then, the display interface further includes the vacant window position. The (n+2)th application window does not exist, that is, the (n+1)th application window is an end window of the window queue, such that the vacant window position is no longer filled.

In addition, the current display interface further includes width adjusting controls separately configured between every two adjacent application windows. The width adjusting control is configured to adjust a width of the application window. For instance, if the starting point direction is from right to left, the width adjusting control is configured to adjust a width of an application window on a left side of the width adjusting control. The width of the corresponding application window is adjusted by dragging or clicking on the width adjusting control (including single-clicking and double-clicking, for instance, single-clicking on the width adjusting control to increase the width of the corresponding application window, and double-clicking on the width adjusting control to decrease the width of the corresponding application window). The width of the application window may be switched between d/3 and 2d/3.

Figure 8:
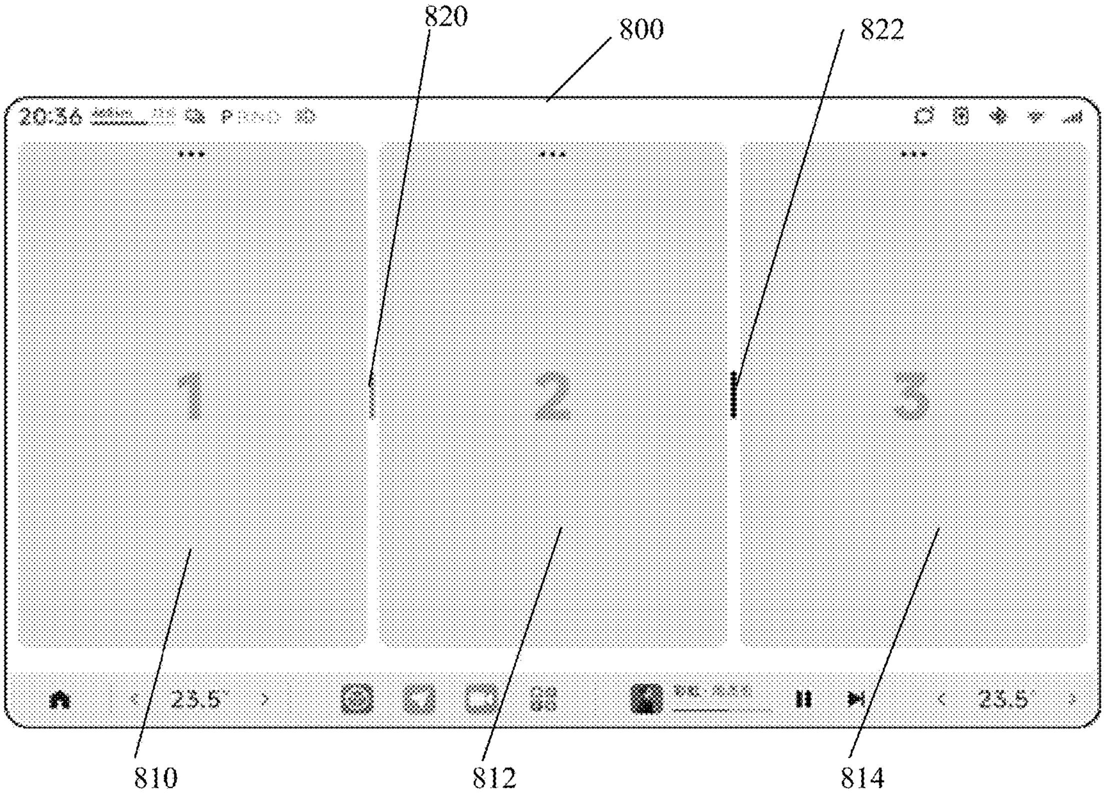
FIG. 8 is a schematic diagram of a current display interface according to yet another example.

For instance, as shown in FIG. 8, the current display interface 800 includes the window 1 810, the window 2 812, and the window 3 814. A width adjusting control (vertical bar) 820 is configured between the window 1 and the window 2, and a width adjusting control (vertical bar) 822 is configured between the window 2 and the window 3. The width adjusting control between the window 1 and the window 2 is configured to adjust the width of the window 1, and the width adjusting control between the window 2 and the window 3 is configured to adjust the width of the window 2.

Figure 9A:
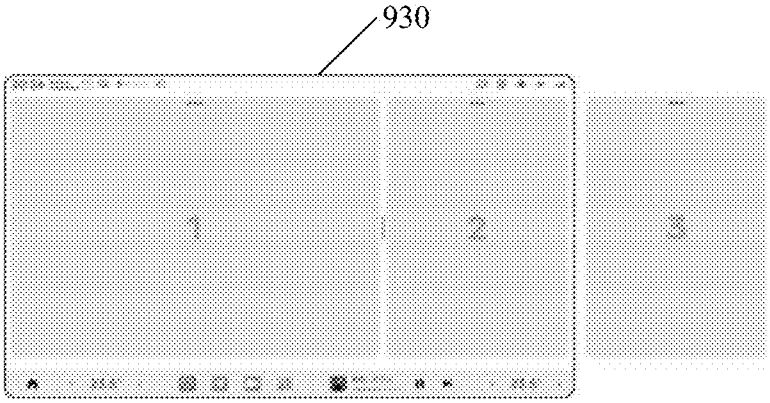
FIG. 9A is a schematic diagram of adjusting an application window width according to an example.
Figure 9B:
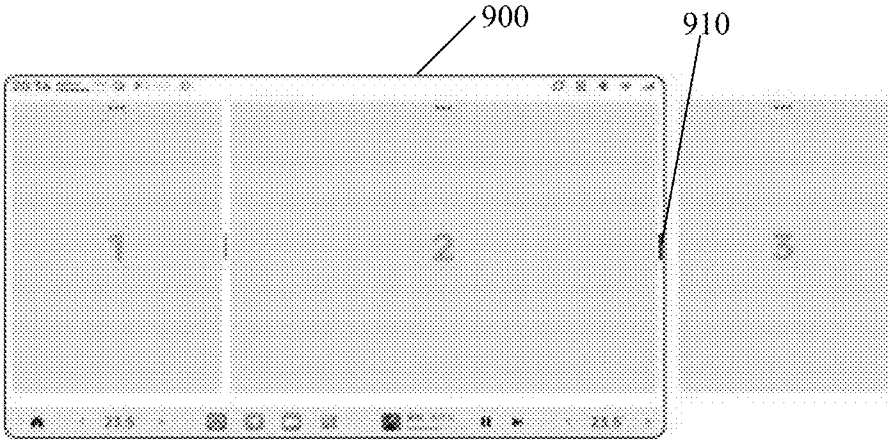
FIG. 9B is a schematic diagram of adjusting an application window width according to another example.

In addition, in response to determining that the width of an application window away from the starting point direction is 2d/3, the current display interface further includes a width adjusting control configured on a second vertical edge, away from the starting point direction, of the current display interface. As shown in FIGS. 9B and 10B, the current display interface 900, 1000 (respectively) further includes a width adjusting control 910, 1010 (respectively) configured on a right edge (that is, the second vertical edge) of the current display interface.

The window width adjusting operation may be a first control operation for any one of the width adjusting controls in the current display interface. The first control operation may be a dragging operation, a clicking operation, etc.

In response to determining that the application window editing operation is the window width adjusting operation, the application window layout of the current display interface may be adjusted according to the application window editing operation and the window queue as follows: the window width of the current display interface is at least adjusted according to the first control operation and the window queue.

The specific embodiment of the step that the window width of the current display interface is at least adjusted according to the first control operation and the window queue will be described in detail below.

In one embodiment, n=3, and the widths of the n application windows each are d/3. In response to determining that the first control operation is to drag any one of the width adjusting controls away from the starting point direction, a width of a target application window is stretched to 2d/3. An nth application window in the current display interface is pushed to a display interface subsequent to the current display interface. The target application window is an application window, close to the starting point direction, of application windows at two ends of the width adjusting control targeted by the first control operation.

In the disclosure, in response to determining that the number of application windows in the current display interface is 3, widths of the three application windows in the current display interface are all d/3. In this case, the current display interface includes two width adjusting controls. Any one of the width adjusting controls is dragged away from the starting point direction, and the width of the target application window may be stretched to 2d/3. In this case, the nth application window in the current display interface is pushed out of the display interface of the in-vehicle terminal.

For instance, the current display interface 800 is as shown in FIG. 8. The width adjusting control 820 between the window 1 and the window 2 is dragged rightward, such that the width of the window 1 810 is increased. In this case, the width of the window 1 is adjusted from d/3 to 2d/3, and the window 3 is pushed out of the current display interface, such that the display interface 930 shown in FIG. 9A is obtained.

Further, for instance, the current display interface is as shown in FIG. 8. The width adjusting control 822 between the window 2 and the window 3 is dragged rightward, such that the width of the window 2 812 is increased. In this case, the width of the window 2 is adjusted from d/3 to 2d/3, and the window 3 814 is pushed out of the current display interface, such that the display interface 900 shown in FIG. 9B is obtained.

In another embodiment, n=2, the width of the n application windows is d/3 or 2d/3, and an application window with a width of 2d/3 in the current display interface is close to the starting point direction. In this case, in response to determining that the first control operation is to drag a width adjusting control to the starting point direction and the (n+1)th application window exists, a width of the application window close to the starting point direction is reduced to d/3, and the application window, away from the starting point direction, of the current display interface and the (n+1)th application window are translated to the starting point direction by a width of d/3 and are displayed in the current display interface.

In the disclosure, when the number of application windows in the current display interface is 2 and an application window with a width of 2d/3 in the current display interface is close to the starting point direction, the current display interface includes one width adjusting control. The width of the application window close to the starting point direction may be reduced to d/3 by dragging the width adjusting control to the starting point direction, and then whether the (n+1)th application window exists may be determined. In response to determining that the (n+1)th application window exists, the (n+1)th application window is added to a new vacant window position by a width of d/3. In response to determining that the (n+1)th application window does not exist, a window filling operation is not required.

For instance, as shown in FIG. 10A, the current display interface 1000 includes the window 1 1012 with the width of 2d/3 close to the starting point direction and the window 2 1014 with the width of d/3 away from the starting point direction. In this case, the width of the window 1 may be adjusted to d/3 by dragging the width adjusting control between the window 1 and the window 2 leftward. The window 1 is not a rightmost application window in the current display interface, so the window 2 is moved leftward to be adjacent to the window 1. In this case, the display interface includes a new vacant window position with the width of d/3 adjacent to a right edge of the display interface. In response to determining that the (n+1)th application window "window 3" exists, the window 3 is added to the new vacant window position, and the display interface 800 shown in FIG. 8 is obtained. In response to determining that the (n+1)th application window does not exist, the window filling operation is not required, and the display interface 1030 shown in FIG. 10C is obtained.

In yet another embodiment, n=2, the widths of the n application windows are d/3 and 2d/3 respectively, and the application window with the width of d/3 in the current display interface is close to the starting point direction. In this case, the window width of the current display interface may be at least adjusted according to the first control operation and the window queue as follows:

In response to determining that the first control operation is to drag a width adjusting control close to the starting point direction away from the starting point direction, a width of a first application window in the current display interface is stretched to 2d/3, and a width of a second application window in the current display interface is reduced to d/3.

In the disclosure, when the number of application windows in the current display interface is 2 and the application window with the width of d/3 in the current display interface is close to the starting point direction, the current display interface includes two width adjusting controls. The width of the first application window in the current display interface may be stretched to 2d/3 by dragging the width adjusting control between the two application windows away from the starting point direction. That is, the width of the application window close to the starting point direction is stretched to 2d/3, and a width of the second application window in the current display interface is reduced to d/3.

As shown in FIG. 10B, the current display interface 1000 includes the window 1 1016 with the width of d/3 close to the starting point direction and the window 2 1018 with the width of 2d/3 away from the starting point direction. In this case, the width of the window 1 may be adjusted to 2d/3 by dragging the width adjusting control 1010 between the window 1 and the window 2 leftward, In this case, the sum of the width of the window 1 and the width of the window 2 is greater than d. In order to make the number of application windows adjusted as small as possible, the width of the window 2 may be adjusted to d/3, such that the display interface 1000 shown in FIG. 10A is obtained.

In response to determining that the first control operation is to drag a width adjusting control away from the starting point direction to the starting point direction, the width of an application window away from the starting point direction is reduced to d/3. In response to determining that the (n+1)th application window exists, the (n+1)th application window is translated to the starting point direction by the width of d/3 and is displayed in the current display interface.

In the disclosure, when the number of application windows in the current display interface is 2 and an application window with a width of d/3 in the current display interface is close to the starting point direction, the current display interface includes two width adjusting controls. The width of an application window away from the starting point direction may be reduced to d/3 by dragging the width adjusting control (the width adjusting control on the second vertical edge) away from the starting point direction to the starting point direction, and then whether the (n+1)th application window exists may be determined. In response to determining that the (n+1)th application window exists, the (n+1)th application window is translated to the starting point direction by the width of d/3 and displayed in the current display interface. In response to determining that the (n+1)th application window does not exist, the filling operation is not required. In this case, the display interface includes a vacant window position with the width of d/3.

For instance, as shown in FIG. 10B, the current display interface 1000 includes the window 1 1016 with the width of d/3 close to the starting point direction and the window 2 1018 with the width of 2d/3 away from the starting point direction. In this case, the width of the window 2 may be adjusted to d/3 by dragging the width adjusting control between the window 2 and a right edge of the current display interface leftward. The window 2 is a rightmost application window in the current display interface, so a window leftward-moving operation is not required. In this case, the display interface includes a new vacant window position with the width of d/3 adjacent to the right edge of the display interface. In this case, in response to determining that the (n+1)th application window "window 3" exists, the window 3 is added to the new vacant window position, and the display interface shown in FIG. 8 is obtained. In response to determining that the (n+1)th application window does not exist, the window filling operation is not required, and the display interface 1030 shown in FIG. 10C is obtained.

In yet another embodiment, n=2, and the widths of the two application windows in the current display interface both are d/3. That is, in response to determining that the first control operation is to drag any one of the width adjusting controls away from the starting point direction, the width of the target application window is stretched to 2d/3.

In the disclosure, in response to determining that the number of application windows in the current display interface is 2 and the vacant window position exists in the current display interface, it is indicated that the current display interface includes two application windows each with a width of d/3 and one vacant window position with a width of d/3, and the current display interface includes two width adjusting controls. In this case, in response to determining that any one of the width adjusting controls is dragged away from the starting point direction, the width of the target application window may be adjusted to 2d/3, in this case, the sum of the width of the target application window adjusted and a width of another application window is just equal to d, and window pushing and window filling operations are not required.

As shown in FIG. 10C, the current display interface 1030 includes the window 1 1032 with the width of d/3 and the window 2 1034 with the width of d/3. In this case, the width of the window 2 may be adjusted to 2d/3 by dragging the width adjusting control at a right side of the window 2 leftward, and the display interface 1000 shown in FIG. 10B may be obtained. Alternatively, the width of the window 1 may be adjusted to 2d/3 by dragging the width adjusting control between the window 1 and the window 2 leftward, and the display interface 1000 shown in FIG. 10A may be obtained.

In yet another embodiment, in response to determining n=1 (that is, the current display interface includes one width adjusting control): when a width of the application window is 2d/3, if the first control operation is to drag a width adjusting control to the starting point direction, the width of the application window is adjusted to 2d/3; and when a width of the application window is d/3, if the first control operation is to drag a width adjusting control away from the starting point direction, the width of the application window is adjusted to d/3.

For instance, as shown in FIG. 11A, the current display interface 1100 includes the window 1 1110 with the width of 2d/3. The width of the window 1 may be adjusted to d/3 by dragging the width adjusting control at the right side of the window 1 leftward, such that the display interface 1120 shown in FIG. 11B is obtained.

Further, for instance, as shown in FIG. 11B, the current display interface 1120 includes the window 1 1112 with the width of d/3. The width of the window 1 may be adjusted to 2d/3 by dragging the width adjusting control 1114 at the right side of the window 1 rightward, such that the display interface 1100 shown in FIG. 11A is obtained.

In addition, in response to determining that n=3 and the widths of the n application windows each are d/3, when the first application window in the current display interface is located at a starting point of the window queue, the width adjusting control close to the starting point direction is further configured to adjust a width of the application window, away from the starting point direction, of the application windows at two ends of the width adjusting control. That is, when the first application window in the current display interface is located at the starting point of the window queue, the width adjusting control between the first application window and the second application window may be configured to adjust the width of the first application window and adjust the width of the second application window.

For instance, as shown in FIG. 8, in response to determining that the leftmost application window "window 1" 810 in the current display interface 800 is a start window of the window queue, the width adjusting control between the window 1 and the window 2 may be configured to adjust the width of the window 1 and further adjust the width of the window 2.

In this case, the step that the window width of the current display interface is at least adjusted according to the first control operation and the window queue may further include the following steps:

- in response to determining that the first control operation is to drag a width adjusting control close to the starting point direction to the starting point direction, the width of the second application window in the current display interface is adjusted to 2d/3. The first application window is temporarily pushed out of the current display interface in the starting point direction.

Figure 12:
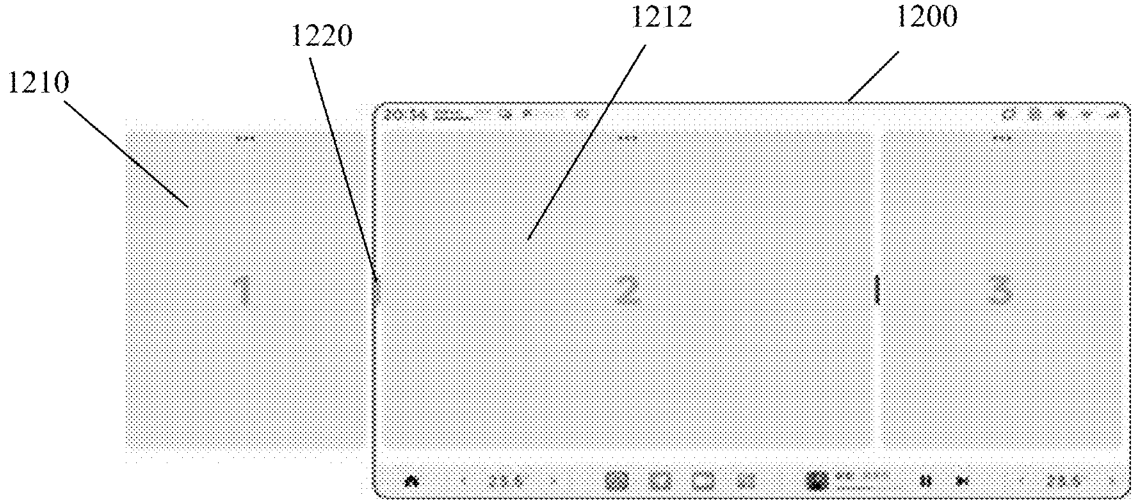
FIG. 12 is a schematic diagram of adjusting an application window width according to yet another example.

For instance, as shown in FIG. 8, the width adjusting control 820 between the window 1 810 and the window 2 820 is dragged leftward, such that the width of the window 2 is increased. In this case, the width of the window 2 is adjusted from d/3 to 2d/3, and the window 1 is temporarily pushed out of the current display interface, such that the display interface 1200 shown in FIG. 12 is obtained.

In response to determining that the number of application windows in the current display interface is 3 and the first control operation is to drag a width adjusting control close to the starting point direction to the starting point direction, the width of the second application window in the current display interface is adjusted to 2d/3, and the first application window in the current display interface is temporarily pushed out of the current display interface, such that frustration of the user can be reduced.

After the first application window in the current display interface is temporarily pushed out of the current display interface, the method may further include the following two steps:

- the width adjusting control is displayed on a first vertical edge close to the starting point direction of the current display interface; and
- in response to receiving a second control operation for the width adjusting control on the first vertical edge, the width of the second application window in the current display interface is adjusted to d/3, and the first application window temporarily pushed out of the current display interface is translated back to the current display interface.

In the disclosure, the second control operation is to drag the width adjusting control on the first vertical edge away from the starting point direction. In response to receiving the second control operation for the width adjusting control on the first vertical edge, the width of the second application window in the current display interface is adjusted to d/3, such that a window position closest to the starting point direction may be vacated. Then, the first application window temporarily pushed out of the display interface may be translated back to the vacated window position.

For instance, as shown in FIG. 12, after the window 1 1210 is temporarily pushed out of the current display interface 1200, the width adjusting control 1220 is displayed between the window 2 1212 and a left edge of the current display interface. When the width adjusting control is dragged rightward, the width of the window 2 is adjusted to d/3, such that a window position adjacent to the left edge of the current display interface may be vacated. Then, the window 1 temporarily pushed out may be translated back to the vacated window position, and the display interface 800 shown in FIG. 8 may be obtained.

In response to determining that the application window editing operation is the window adding operation, the application window layout of the current display interface may be adjusted according to the application window editing operation and the window queue as follows:

a to-be-added window is added to the current display interface at least according to existence of the vacant window position in the current display interface, where the to-be-added window is an application window corresponding to the window adding operation.

The specific embodiment of the step that the to-be-added window is added to the current display interface at least according to the existence of the vacant window position in the current display interface will be described in detail below.

In one embodiment, in response to determining that the vacant window position exists in the current display interface, a width of the to-be-added window is adjusted according to a width of the vacant window position and the width of the to-be-added window, and then the to-be-added window is added to the vacant window position.

Specifically, in response to determining that the width of the to-be-added window is smaller than or equal to that of the vacant window position, the to-be-added window is added to the vacant window position according to the original width. In response to determining that the width of the to-be-added window is greater than that of the vacant window position, the width of the to-be-added window is reduced to the width of the vacant window position, and then the to-be-added window is added to the vacant window position.

In another embodiment, n=1, the width of the application window is d/3 or 2d/3, and the width of the to-be-added window is d/3 by default. In this case, the to-be-added window may be added to the current display interface at least according to the existence of the vacant window position in the current display interface as follows:

the to-be-added window is added to the vacant window position adjacent to an application window of an original display interface.

In yet another embodiment, n=2, and the widths of the n application windows are selected to be d/3 and 2d/3. In this case, the to-be-added window may be added to the current display interface at least according to the existence of the vacant window position in the current display interface as follows:

in response to determining that no vacant window position exists in the current display interface, a width of an application window with a width of 2d/3 in the current display interface is reduced to d/3, 1 is added to n, and the to-be-added window with a width of d/3 is added as the nth application window in the current display interface to the current display interface; and in response to determining that the vacant window position exists in the current display interface, the to-be-added window is added to the vacant window position of an original display interface.

In the disclosure, in response to determining that the current display interface includes two application windows and widths of the two application windows are d/3 and 2d/3 respectively, the width of the application window with the width of 2d/3 in the current display interface is reduced to d/3. No matter how large the to-be-added window is, the to-be-added window is added by the width of d/3 to the nth application window in the current display interface.

Figure 13:
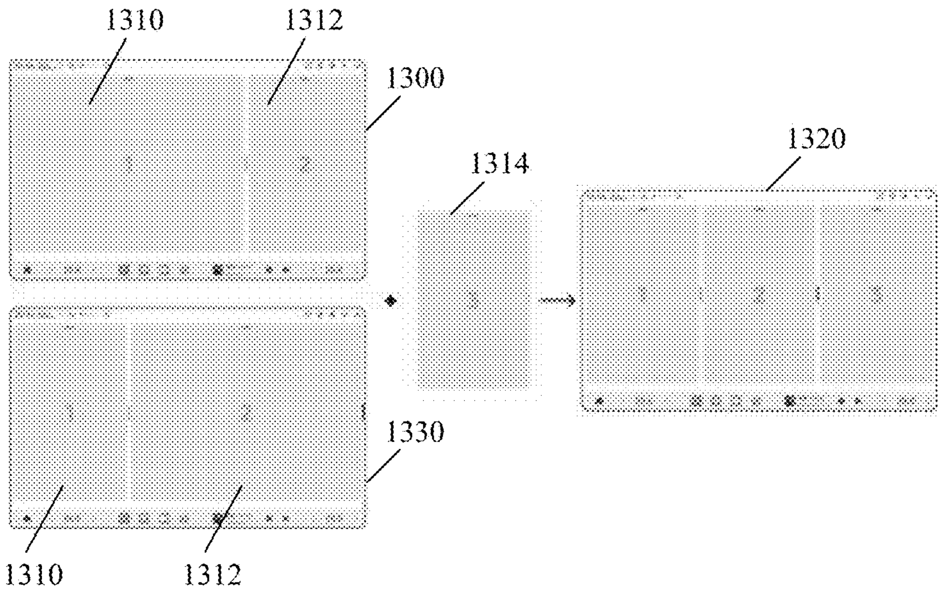
FIG. 13 is a schematic diagram of adding an application window according to an example.

For instance, as shown in a left top in FIG. 13, the current display interface 1300 includes the window 1 1310 and the window 2 1312, where the width of the window 1 is 2d/3, the width of the window 2 is d/3, and the to-be-added window is the window 3 1314. In this case, the width of the window 1 may be reduced to d/3, and after the window 3 is added to the window 2 by the width of d/3, the display interface 1320 at a right side of FIG. 13 may be obtained.

Further, for instance, as shown in a left bottom in FIG. 13, the current display interface 1330 includes the window 1 1310 and the window 2 1312, where the width of the window 1 is d/3, the width of the window 2 is 2d/3, and the to-be-added window is the window 3. In this case, the width of the window 2 may be reduced to d/3, and after the window 3 is added to the window 2 by the width of d/3, the display interface 1320 at the right side of FIG. 13 may be obtained.

In another embodiment, n=3, and the widths of the n application windows each are d/3. In this case, the to-be-added window may be added to the current display interface at least according to the existence of the vacant window position in the current display interface as follows: the to-be-added window is added by the width of d/3 to a position of the nth application window in the current display interface, where an original nth application window in the current display interface is pushed to a display interface subsequent to the current display interface.

In the disclosure, in response to determining that the current display interface includes three application windows and widths of the three application windows are all d/3, no vacant window position exists in the current display interface. In this case, no matter how large the to-be-added window is, the to-be-added window is added by the width of d/3 to the position of the nth application window in the current display interface, where the original nth application window in the current display interface is pushed to the display interface subsequent to the current display interface.

Figure 14:
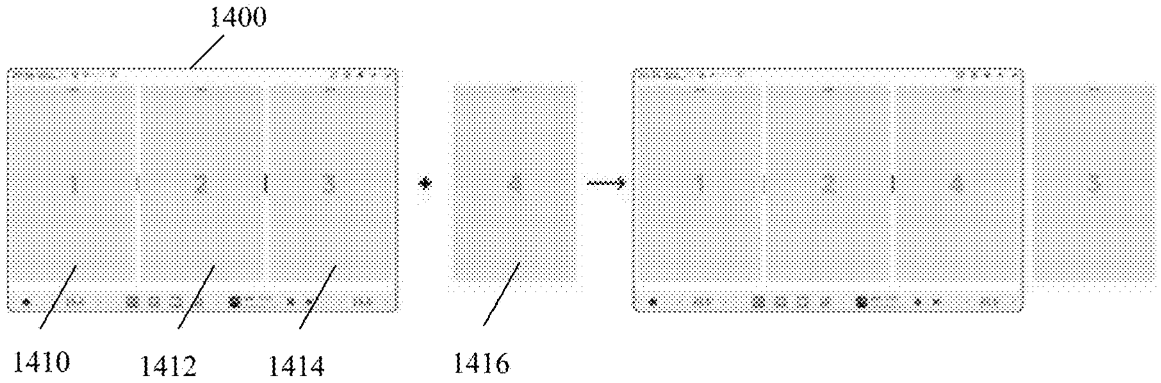
FIG. 14 is a schematic diagram of adding an application window according to another example.

For instance, as shown in FIG. 14, the current display interface 1400 includes the window 1 1410, the window 2 1412, and the window 3 1414, the widths of the three windows are all d/3, and the to-be-added window is the window 4 1416. In this case, no matter how large the window 4 is, the window 4 is added by the width of d/3 to the position of the window 3, such that the window 3 is pushed out of the current display interface.

In addition to adjusting the application window layout of the display interface in the in-vehicle terminal, the entire display interface may be switched. In the disclosure, interface switching may be conducted in various modes. In one embodiment, interface switching may be conducted through gestures or an interface switching control configured on the display interface in the current display interface.

Figure 15A:
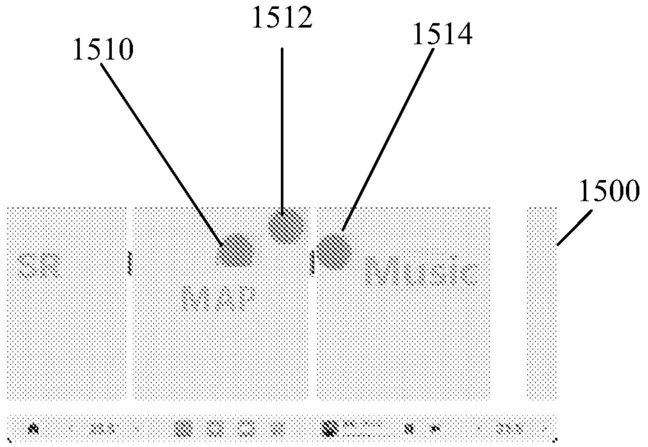
FIG. 15A is a schematic diagram of switching a display interface according to an example.

Specifically, interface switching may be conducted by swiping leftward and rightward on the display interface with gestures. For instance, when the display interface is swiped leftward by a preset distance and a next interface exists, in response to detecting a release operation, the current display interface is switched to the next interface. When the display interface is swiped rightward by a preset distance and a previous interface exists, in response to detecting a release operation, the current display interface is switched to the previous interface. As shown in FIG. 15A, the current display interface 1500 is swiped with three fingers 1510, 1512, 1514.

In a swiping process, the display interface moves along with a hand. When a swipe distance is smaller than a size of the display interface, or no corresponding adjacent interface exists, the display interface moves along with the hand, and the current display interface is returned to after the hand is released.

Figure 15B:
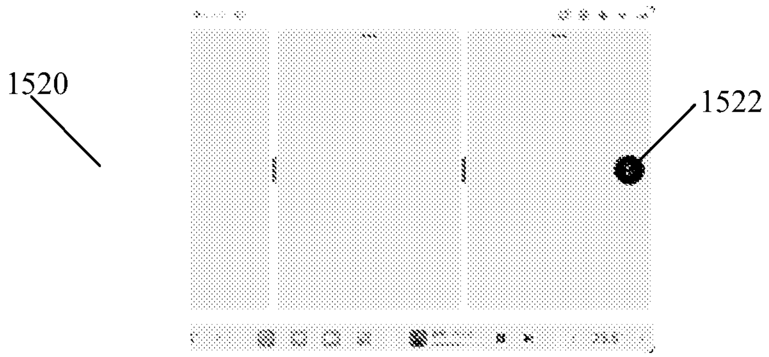
FIG. 15B is a schematic diagram of switching a display interface according to another example.

When the user clicks on any position in an effective zone of the current display interface, an interface switching control (such as a page turning key 1520, 1522 as shown in FIG. 15B) is displayed in the current display interface, and the user conducts interface switching through the interface switching control.

In yet another embodiment, interface switching may be conducted in an interface preview mode. The interface preview mode may be entered by clicking on a HOME key in the current display interface by user, such that the interface may be viewed and switched.

Figure 16A:
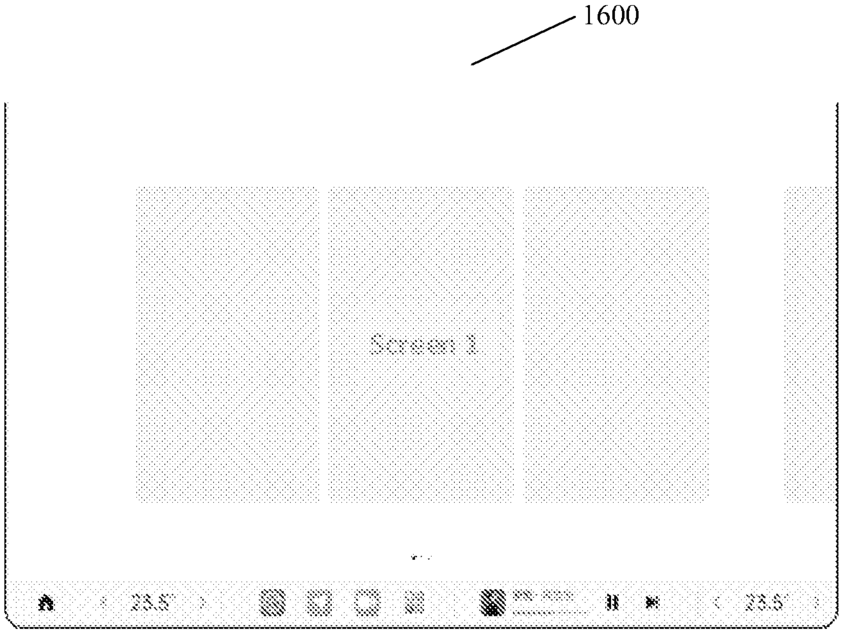
FIG. 16A is a schematic diagram of an interface preview mode according to an example.
Figure 16B:
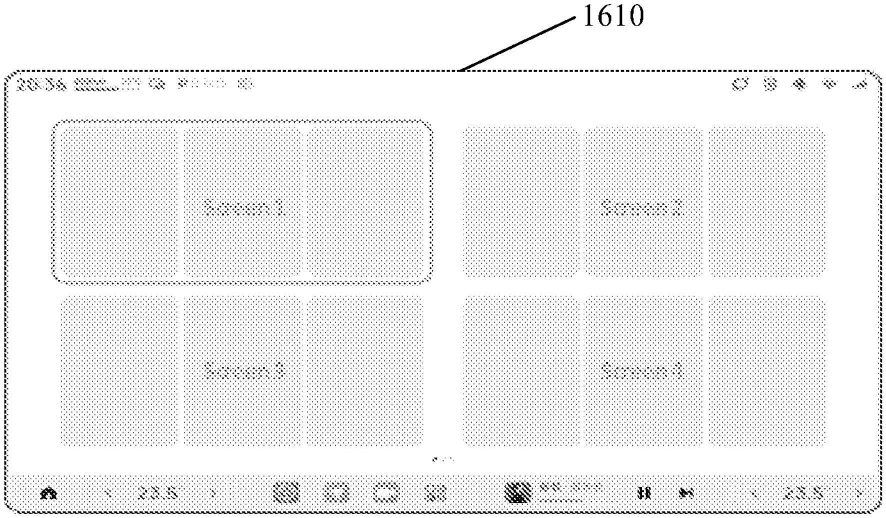
FIG. 16B is a schematic diagram of an interface preview mode according to another example.
Figure 16C:
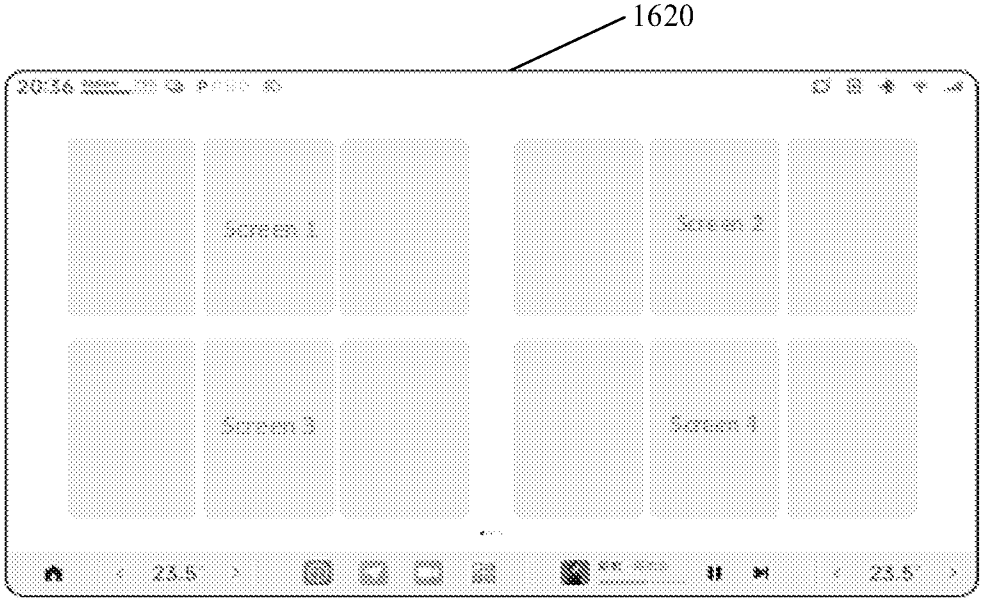
FIG. 16C is a schematic diagram of an interface preview mode according to yet another example.

In the interface preview mode, each interface may be displayed in different arrangement modes, for instance, in a straight-line shape (as shown in FIG. 16A 1600), a zigzag shape with the current display interface highlighted (as shown in FIG. 16B 1610), and a zigzag shape without the current display interface highlighted (as shown in FIG. 16C 1620). The user may select a to-be-switched interface through a clicking operation.

When each interface is arranged in a straight-line shape, if there are a plurality of interfaces, a paging indicator may be displayed at a bottom, and the user may preview different interfaces by sliding leftward and rightward.

In addition, when the user conducts interface switching through a non-gesture operation, gesture switching teaching may be conducted. When the user finishes the teaching procedure once, gesture switching teaching no longer appears.

For instance, when the interface preview mode is exited, if the current display interface is inconsistent with that when the interface preview mode is entered, a reverse three-finger swipe teaching may appear, which may prompt the user to return to the display interface previous to the current display interface through gestures.

Further, for instance, after the user conducts interface switching through the interface switching control, the reverse three-finger swipe teaching appears, which prompts the user to return to the display interface previous to the current display interface through gestures.

Figure 17A:
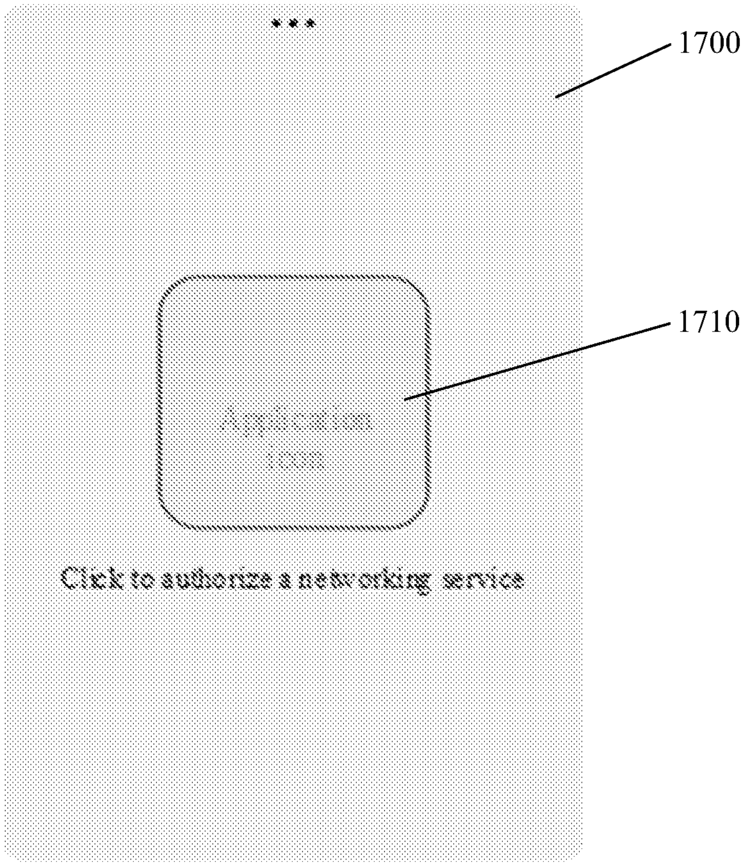
FIG. 17A is a schematic diagram of an application window without China Type Approval (CTA) authorization according to an example.
Figure 17B:
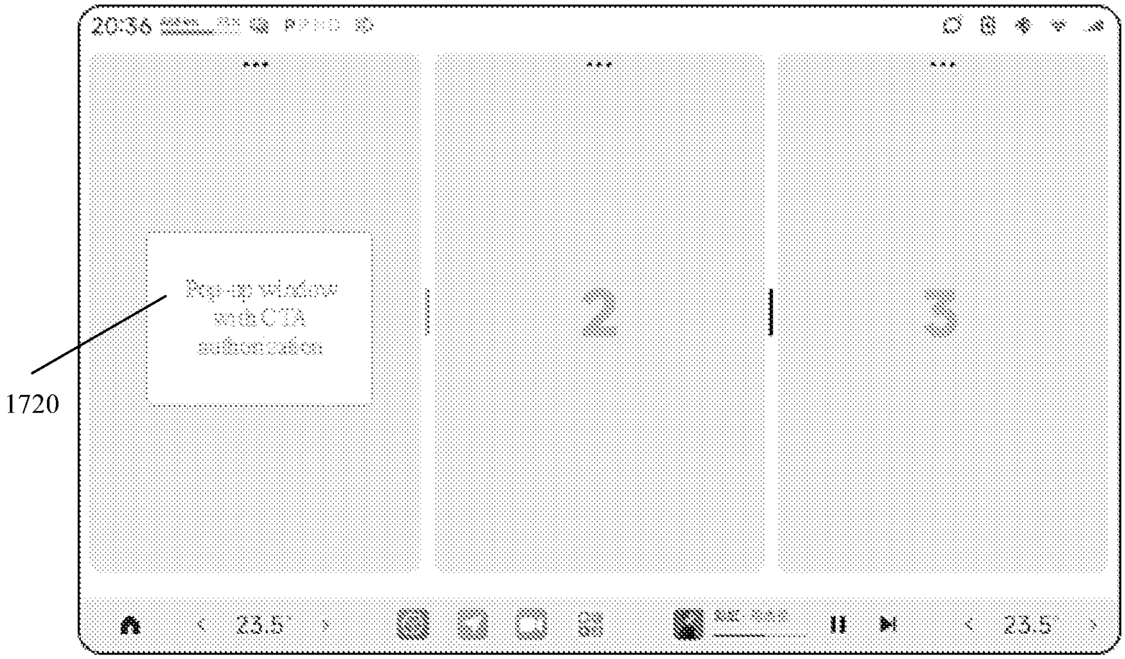
FIG. 17B is a schematic diagram of a pop-up window with CTA authorization according to an example.

In addition, after an application is downloaded, the application may be used after passing the China Type Approval (CTA) of the Ministry of Industry and Information Technology. Thus, if an application without CTA authorization exists in the application window of the current display interface 1700, as shown in FIG. 17A, an icon 1710 of the corresponding application and a prompt message "Click to authorize a networking service" may be displayed in the application window. When the user clicks on the application window, a pop-up window 1720 with CTA authorization may be provided (as shown in FIG. 17B).

In one possible embodiment, in response to determining that the application window editing operation is the window translating operation, the application window layout of the current display interface may be adjusted according to the application window editing operation and the window queue through a plurality of embodiments. In one embodiment, an application window position adjusting button is triggered to suspend a to-be-adjusted application window above the window queue, the to-be-adjusted application window is dragged to a to-be-adjusted position, and original application windows are sequentially arranged backwards along the window queue in a direction opposite to the starting point direction after position determination.

In another possible embodiment, a to-be-adjusted application window is dragged to an edge position of the current display interface, another display interface adjacent to the current display interface is activated, and reordering is conducted in an application window of a new display interface.

Figure 18:
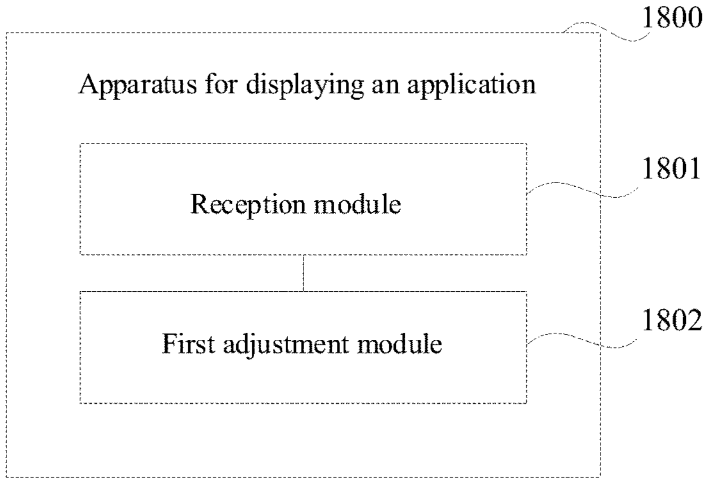
FIG. 18 is a block diagram of an apparatus for displaying an application according to an example.

FIG. 18 is a block diagram of an apparatus for displaying an application according to an example. The apparatus 1800 is performed by an in-vehicle terminal. A current display interface of the in-vehicle terminal includes n application windows, where n≥1. In response to determining n>1, the n application windows are arranged adjacent to each other in a transverse direction. With reference to FIG. 18, the apparatus 200 includes:

a reception module 1810 configured to receive an application window editing operation for the current display interface; and a first adjustment module 1802 configured to adjust an application window layout of the current display interface according to the application window editing operation and a window queue.

The window queue is configured for continuous adjacent arrangement of the n application windows. A status of the window queue is dynamically updated with change of the application window layout. Serial numbers of the application windows in the window queue sequentially increase in a direction opposite to a starting point direction. A serial number of the application window, closest to the starting point direction, of the n application windows is 1. The starting point direction is a direction, close to a driver side, of the in-vehicle terminal.

At least part of a zone of the window queue overlaps a display interface of the in-vehicle terminal, so as to ensure that the application windows in the window queue are displayed in the current display interface.

The technical solution according to the examples of the disclosure can have the following beneficial effects: the in-vehicle terminal adjusts, in response to receiving the application window editing operation for the current display interface, the application window layout of the current display interface according to the application window editing operation and the window queue. The window queue is configured for continuous adjacent arrangement of the n application windows in the current display interface. The status of the window queue is dynamically updated with change of the application window layout of the current display interface. The at least part of the zone of the window queue overlaps the display interface of the in-vehicle terminal, so as to ensure that the application windows in the window queue are displayed in the current display interface. In this way, self-adaptive adjustment of display content and a display window size in the display interface can be implemented according to a user operation, and a use experience of a user can be improved. In addition, one or more application windows can be displayed in the display interface of the in-vehicle terminal, such that the display interface can have more display forms, and a use ratio of the display interface and a visual experience of the user can be improved. In addition, when split-screen display is conducted in the display interface, different applications can be separately displayed in each display window, which facilitates use.

Optionally, the application window editing operation is a window removing operation.

The first adjustment module 1802 includes:

a first determination sub-module configured to determine a to-be-removed window in the current display interface according to the window removing operation;

a removal sub-module configured to remove the to-be-removed window n from the current display interface;

a second determination sub-module configured to determine whether an (n+1)th application window exists; and a first translating sub-module configured to translate, in response to determining that the (n+1)th application window exists, an application window having a serial number greater than that of the to-be-removed window n in the window queue sequentially to the starting point direction, and display the application window in the current display interface.

Optionally, the first translating sub-module includes:

an obtaining sub-module configured to obtain a first width of the (n+1)th application window and a second width of the to-be-removed window; and a third determination sub-module configured to determine a translating strategy according to a comparison result of the first width and the second width.

Optionally, the third determination sub-module includes:

a fourth determination sub-module configured to determine, in response to determining that the first width is greater than the second width, the translating strategy to reduce the first width of the (n+1)th application window to the second width, translate the (n+1)th application window to the starting point direction, and display the (n+1)th application window in the current display interface.

Optionally, the third determination sub-module includes:

a sixth determination sub-module configured to determine, in response to determining that the first width is smaller than the second width and an (n+2)th application window exists, the translating strategy to keep a width of the (n+1)th application window unchanged, translate the (n+1)th application window to the starting point direction, and display the (n+1)th application window in the current display interface; and translate the (n+2)th application window to the starting point direction by a width equaling a difference between the second width and the first width, and display the (n+2)th application window in the current display interface; and a seventh determination sub-module configured to determine, in response to determining that the first width is smaller than the second width and the (n+2)th application window does not exist, the translating strategy to keep a width of the (n+1)th application window unchanged, translate the (n+1)th application window to the starting point direction, and display the (n+1)th application window in the current display interface.

Optionally, the third determination sub-module includes:

an eighth determination sub-module configured to determine, in response to determining that the first width is equal to the second width, the translating strategy to keep a width of the (n+1)th application window unchanged, translate the (n+1)th application window to the starting point direction, and display the (n+1)th application window in the current display interface.

Optionally, the application window editing operation is a window removing operation.

The adjustment module 1802 includes:

a switching sub-module configured to switch, in response to determining that n=1 and the to-be-removed window is not located at a starting point of the window queue, the current display interface to a display interface previous to the current display interface.

Optionally, n=3, the current display interface includes n application windows, and an nth application window includes two or more different application interfaces.

Optionally, the application window editing operation is a window width adjusting operation.

The current display interface further includes width adjusting controls separately configured between every two adjacent application windows. The width adjusting control is configured to adjust a width of the application windows.

The window width adjusting operation is a first control operation for any one of the width adjusting controls.

The adjustment module 1802 includes:

an adjustment sub-module configured to at least adjust a window width of the current display interface according to the first control operation and the window queue.

Optionally, in response to determining n=3, widths of the n application windows each are d/3, where d denotes a width of the current display interface, the adjustment sub-module includes:

a first stretching sub-module configured to stretch, in response to determining that the first control operation is to drag any one of the width adjusting controls away from the starting point direction, a width of a target application window to 2d/3, where an nth application window in the current display interface is pushed to a display interface subsequent to the current display interface, and the target application window is an application window, close to the starting point direction, of application windows at two ends of the width adjusting control targeted by the first control operation.

Optionally, in response to determining n=3, widths of the n application windows each are d/3, where d denotes a width of the current display interface, in response to determining that a first application window in the current display interface is located at a starting point of the window queue, the width adjusting control close to the starting point direction is further configured to adjust a width of the application window, away from the starting point direction, of application windows at two ends of the width adjusting control.

The adjustment sub-module further includes:

a second stretching sub-module configured to adjust, in response to determining that the first control operation is to drag a width adjusting control close to the starting point direction to the starting point direction, a width of a second application window in the current display interface to 2d/3, where the first application window is temporarily pushed out of the current display interface in the starting point direction.

Optionally, the apparatus 1800 further includes:

a display module configured to display, after the first application window is temporarily pushed out of the current display interface, a width adjusting control on a first vertical edge close to the starting point direction of the current display interface; and a second adjustment module configured to adjust, in response to receiving a second control operation for the width adjusting control on the first vertical edge, a width of a second application window in the current display interface to d/3, and translate the first application window temporarily pushed out of the current display interface back to the current display interface, where the second control operation is to drag a width adjusting control on the first vertical edge away from the starting point direction.

Optionally, in response to determining n=2, widths of the n application windows each are d/3 or 2d/3, and the application window with the width of 2d/3 in the current display interface is close to the starting point direction, where d denotes a width of the current display interface.

The adjustment sub-module includes:

a first reduction sub-module configured to reduce, in response to determining that the first control operation is to drag the width adjusting control to the starting point direction and an (n+1)th application window exists, a width of the application window close to the starting point direction to d/3, translate the application window, away from the starting point direction, of the current display interface and the (n+1)th application window to the starting point direction by a width of d/3, and display the application window and the (n+1)th application window in the current display interface.

Optionally, in response to determining n=2, widths of the n application windows are d/3 and 2d/3 respectively, and the application window with the width of d/3 in the current display interface is close to the starting point direction, where d denotes a width of the current display interface.

The current display interface further includes a width adjusting control configured on a second vertical edge, away from the starting point direction, of the current display interface.

The adjustment sub-module includes:

a third stretching sub-module configured to stretch, in response to determining that the first control operation is to drag a width adjusting control close to the starting point direction away from the starting point direction, a width of a first application window in the current display interface to 2d/3, and reduce a width of a second application window in the current display interface to d/3.

Optionally, the adjustment sub-module further includes:

a first reduction sub-module configured to reduce, in response to determining that the first control operation is to drag a width adjusting control away from the starting point direction to the starting point direction, a width of the application window away from the starting point direction to d/3; and a second translating sub-module configured to translate, in response to determining that an (n+1)th application window exists, the (n+1)th application window to the starting point direction by a width of d/3, and display the (n+1)th application window in the current display interface.

Optionally, the application window editing operation is a window adding operation;

The first adjustment module 1802 includes:

a first adding sub-module configured to add a to-be-added window to the current display interface at least according to existence of a vacant window position in the current display interface, where the to-be-added window is an application window corresponding to the window adding operation.

Optionally, the first adding sub-module includes:

a second adding sub-module configured to adjust, in response to determining that the vacant window position exists in the current display interface, a width of the to-be-added window according to a width of the vacant window position and the width of the to-be-added window, and then add the to-be-added window to the vacant window position.

Optionally, the second adding sub-module includes:

a third adding sub-module configured to add, in response to determining that the width of the to-be-added window is smaller than or equal to the width of the vacant window position, the to-be-added window to the vacant window position according to an original width; and a fourth adding sub-module configured to reduce, in response to determining that a width of the to-be-added window is greater than that of the vacant window position, a width of the to-be-added window to a width of the vacant window position, and then add the to-be-added window to the vacant window position.

Optionally, a width of the application window is d/3 or 2d/3, and a width of the to-be-added window is d/3, where d denotes a width of the current display interface.

The first adding sub-module includes:

a fifth adding sub-module configured to add, in response to determining that the vacant window position exists in the current display interface, the to-be-added window to the vacant window position adjacent to an application window of an original display interface.

Optionally, in response to determining n=2, a width of the n application windows is selected to be d/3 or 2d/3, where d denotes a width of the current display interface.

The first adding sub-module includes:

a sixth adding sub-module configured to reduce, in response to determining that no vacant window position exists in the current display interface, a width of an application window with a width of 2d/3 in the current display interface to d/3, add 1 to n, and add the to-be-added window by a width of d/3 as an nth application window in the current display interface to the current display interface; and a seventh adding sub-module configured to add, in response to determining that the vacant window position exists in the current display interface, the to-be-added window to the vacant window position of an original display interface.

Optionally, in response to determining n=3, widths of the n application windows each are d/3, where d denotes a width of the current display interface.

The first adding sub-module includes:

an eighth adding sub-module configured to add the to-be-added window by a width of d/3 to a position of the nth application window in the current display interface, where an original nth application window in the current display interface is pushed to a display interface subsequent to the current display interface.

Optionally, the application window editing operation is a window translating operation.

The adjustment module 1802 includes:

a first translating sub-module configured to trigger an application window position adjusting button to suspend a to-be-adjusted application window above the window queue, drag the to-be-adjusted application window to a to-be-adjusted position, and sequentially arrange original application windows backwards along the window queue in a direction opposite to the starting point direction after position determination.

Optionally, the application window editing operation is a window translating operation.

The first adjustment module 1802 includes:

a second translating sub-module configured to drag a to-be-adjusted application window to an edge position of the current display interface, activate another display interface adjacent to the current display interface, and conduct reordering in an application window of a new display interface.

For the apparatus in the above examples, a specific method for each module to execute an operation is described in detail in the examples relating to the method, which will not be described in detail here.

In addition, the disclosure provides a non-transitory computer-readable storage medium, which stores a computer program instruction. The computer program instruction implements steps of the method for displaying an application according to the disclosure when being executed collectively by one or more processors.

The disclosure further provides an in-vehicle terminal. The in-vehicle terminal includes:

one or more processors; and a memory configured to store an instruction executable by the one or more processors.

The one or more processors are collectively configured to execute the executable instruction in the memory, so as to implement steps of the method for displaying an application according to the disclosure.

In addition, the disclosure further provides a vehicle. The vehicle includes the in-vehicle terminal according to the disclosure.

Figure 19:
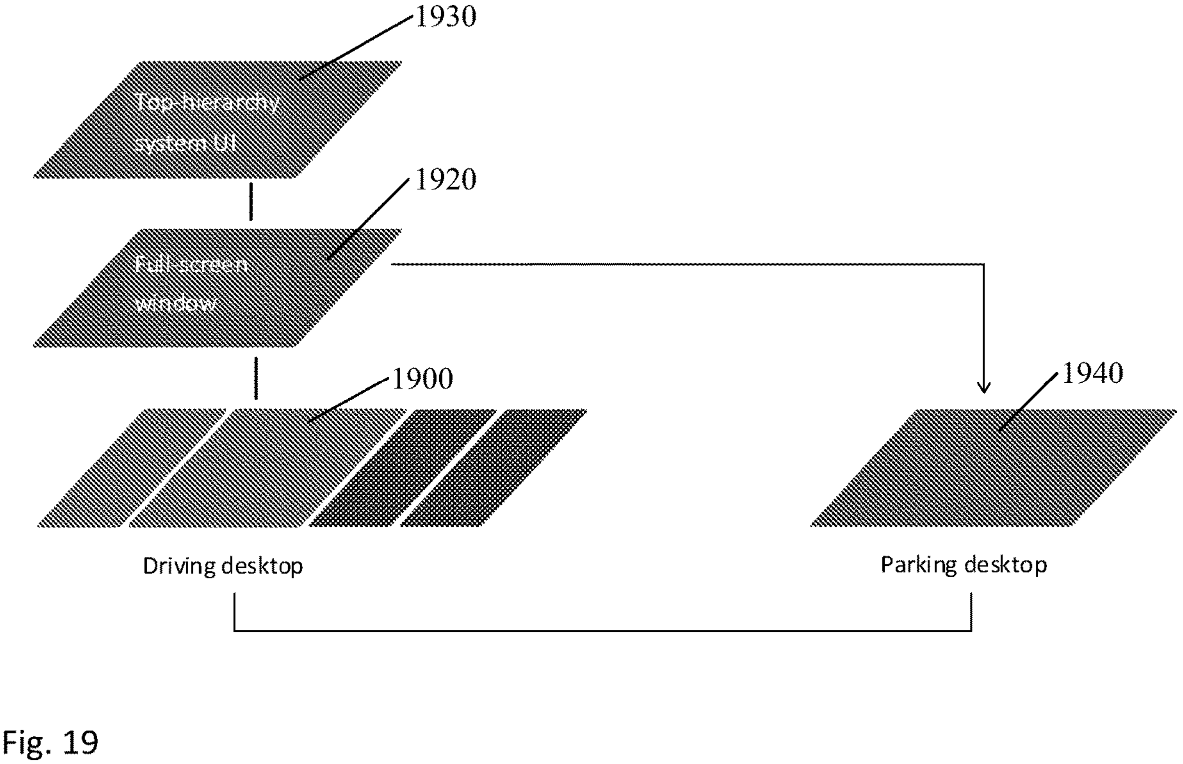
FIG. 19 is a schematic diagram of a desktop hierarchical relation of an in-vehicle terminal according to an example.

As shown in FIG. 19, a hierarchy of a display interface (that is, a driving desktop 1900) of the in-vehicle terminal in a vehicle running process is consistent with that of a widget, which is lower than that of a full-screen window 1920. The hierarchy of the full-screen window is lower than that of a user interface (UI) of a top-hierarchy system 1930. A display interface 1940 (that is, a parking desktop) of the in-vehicle terminal in a parking process is consistent with that of the driving desktop.

Figure 20:
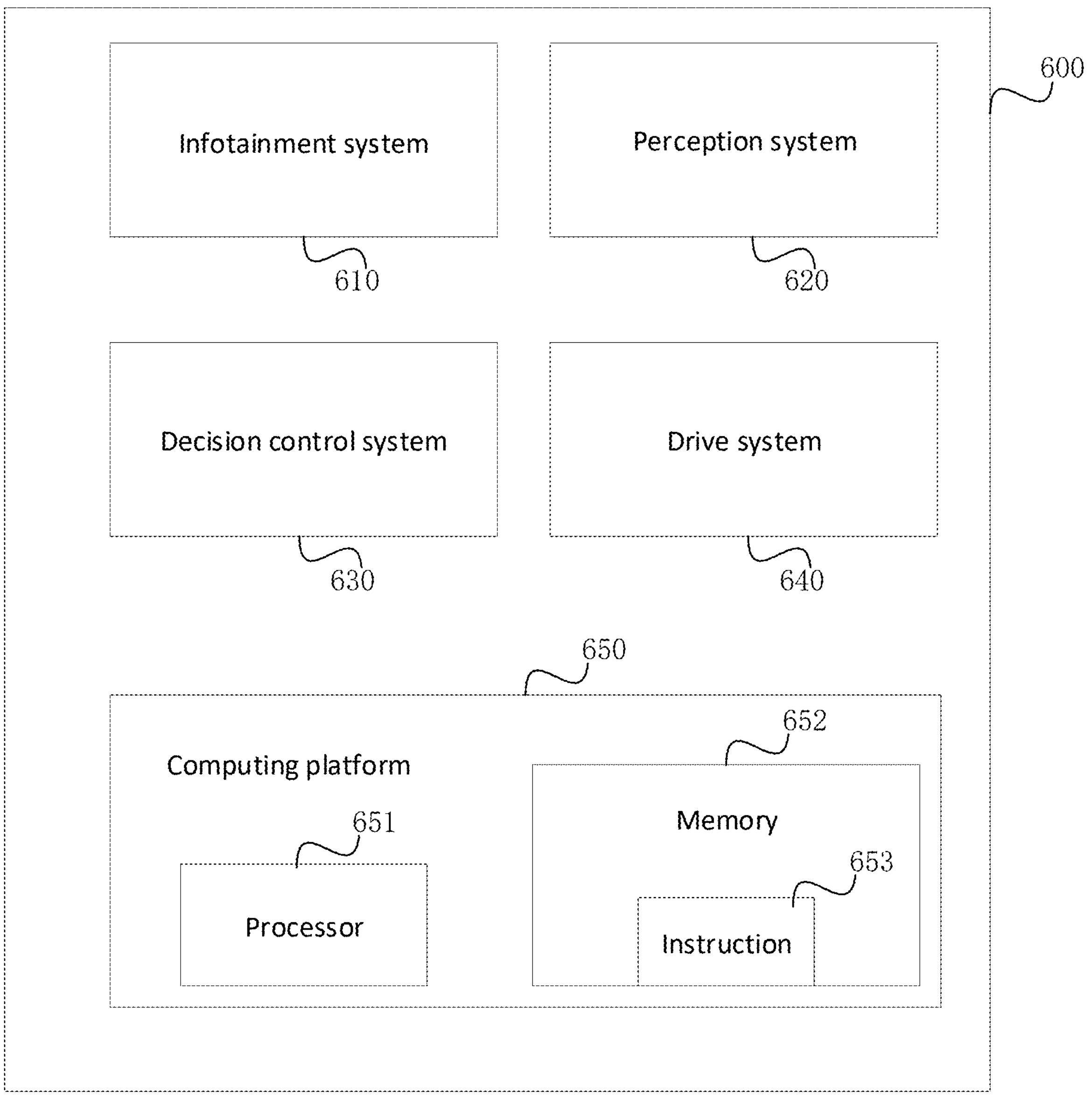
FIG. 20 is a schematic block diagram of functions of a vehicle according to an example.

FIG. 20 is a block diagram of a vehicle 600 according to an example. For instance, the vehicle 600 may be a hybrid electric vehicle, a non-hybrid electric vehicle, an electric vehicle, a fuel cell vehicle, or another type of vehicle. The vehicle 600 may be an autonomous vehicle, a semi-autonomous vehicle, or a non-autonomous vehicle.

With reference to FIG. 20, the vehicle 600 may include various sub-systems, such as an infotainment system 610, a perception system 620, a decision control system 630, a drive system 640, and a computing platform 650. The vehicle 600 may further include more or less sub-systems, and each sub-system may include a plurality of components. In addition, each sub-system and each component of the vehicle 600 may be interconnected in a wired or wireless mode.

In some examples, the infotainment system 610 may include a communication system, an entertainment system, a navigation system, etc.

The perception system 620 may include several sensors configured to sense information of an environment around the vehicle 600. For instance, the perception system 620 may include a global positioning system (the global positioning system may be a GPS system, a Beidou system or another positioning system), an inertial measurement unit (IMU), a laser radar, a millimeter-wave radar, an ultrasonic radar, and a photographing apparatus.

The decision control system 630 may include a computing system, a vehicle controller, a steering system, a throttle, and a braking system.

The drive system 640 may include components that provide power for movement of the vehicle 600. In one example, the drive system 640 may include an engine, an energy source, a transmission system, and wheels. The engine may be one or a combination of an internal combustion engine, an electric motor, and an air compression engine. The engine may convert energy provided by the energy source into mechanical energy.

Some or all functions of the vehicle 600 are controlled by the computing platform 650. The computing platform 650 may include at least one processor 651 and a memory 652. The processor 651 may execute an instruction 653 stored in the memory 652.

The processor 651 may be any conventional processor, such as a central processing unit (CPU) that is commercially available. The processor may also include, for instance, a graphic process unit (GPU), a field programmable gate array (FPGA), a system on chip (SOC), an application specific integrated circuit (ASIC), or a combination of them.

The memory 652 may be implemented by any type of volatile or nonvolatile memory device or their combinations, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk, or an optical disk.

In addition to the instruction 653, the memory 652 may further store data, such as a road map, route information, a vehicle position, direction and speed, and other data. The data stored in the memory 652 may be used by the computing platform 650.

In the example of the disclosure, the processor 651 may execute the instruction 653, so as to complete all or some steps of the above method for displaying an application.

Those skilled in the art could easily conceive of other implementation solutions of the disclosure upon consideration of the description and practice of the disclosure. The disclosure is intended to cover any variations, uses or adaptive changes of the disclosure, which follow the general principles of the disclosure and include common general knowledge or conventional technical means not disclosed in the art. The description and the examples are regarded as merely illustrative, and the true scope and spirit of the disclosure are indicated by the following claims.

It is to be understood that the disclosure is not limited to a precise structure described above and illustrated in the accompanying drawings, and can have various modifications and changes without departing from the scope. The scope of the disclosure is limited merely by the appended claims.

The invention claimed is:

1. A method for displaying an application, performed by an in-vehicle terminal, wherein a current display interface of the in-vehicle terminal comprises n application windows, wherein $n \geq 1$, and in response to determining $n > 1$, the n application windows are arranged adjacent to each other in a transverse direction; and the method comprises:

receiving an application window editing operation for the current display interface; and adjusting an application window layout of the current display interface according to the application window editing operation and a window queue, wherein the window queue is configured for continuous adjacent arrangement of the n application windows, a status of the window queue is dynamically updated with change of the application window layout, serial numbers of application windows in the window queue sequentially increase in a direction opposite to a starting point direction, a serial number of an application window, closest to the starting point direction, of the n application windows is 1, and the starting point direction is a direction, close to a driver side, of the in-vehicle terminal; and at least part of a zone of the window queue overlaps a display interface of the in-vehicle terminal, so as to ensure that application windows in the window queue are displayed in the current display interface, wherein the application window editing operation is a window removing operation, and the adjusting the application window layout of the current display interface comprises:

determining a to-be-removed window in the current display interface according to the window removing operation, removing the to-be-removed window n from the current display interface, and determining whether an (n+1)th application window exists; and in response to determining that the (n+1)th application window exists, obtaining a first width of the (n+1)th application window and a second width of the to-be-removed window, determining a translating strategy according to a comparison result of the first width and the second width, and translating, according to the translating strategy, an application window having a serial number greater than the serial number of the to-be-removed window n in the window queue sequentially to the starting point direction, and displaying the application window in the current display interface, wherein the translating strategy comprises:

in response to the first width being greater than the second width, reducing the first width of the (n+1)th application window to the second width, translating the (n+1)th application window to the starting point direction, and displaying the (n+1)th application window in the current display interface.

2. The method according to claim 1, wherein the application window editing operation is a window removing operation; and the adjusting an application window layout of the current display interface according to the application window editing operation and a window queue comprises:

determining a to-be-removed window in the current display interface according to the window removing operation;

removing the to-be-removed window n from the current display interface;

determining whether an (n+1)th application window exists; and translating, in response to determining that the (n+1)th application window exists, an application window having a serial number greater than the serial number of the to-be-removed window n in the window queue sequentially to the starting point direction, and displaying the application window in the current display interface; and in response to determining that the (n+1)th application window does not exist, determining that the current display interface comprises an end window of the window queue.

3. The method according to claim 1, wherein the translating strategy further comprises at least one of:

in response to the first width being smaller than the second width and an (n+2)th application window existing, keeping a width of the (n+1)th application window unchanged, translating the (n+1)th application window to the starting point direction, displaying the (n+1)th application window in the current display interface, and translating the (n+2)th application window to the starting point direction by a width equaling a difference between the second width and the first width;

in response to the first width being smaller than the second width and the (n+2)th application window not existing, keeping a width of the (n+1)th application window unchanged, translating the (n+1)th application window to the starting point direction, and displaying the (n+1)th application window in the current display interface; or in response to the first width being equal to the second width, keeping a width of the (n+1)th application window unchanged, translating the (n+1)th application window to the starting point direction, and displaying the (n+1)th application window in the current display interface.

4. The method according to claim 1, wherein the application window editing operation is a window removing operation; and the adjusting an application window layout of the current display interface according to the application window editing operation and a window queue comprises:

switching, in response to determining that n=1 and a to-be-removed window corresponding to the window removing operation is not located at a starting point of the window queue, the current display interface to a display interface previous to the current display interface.

5. The method according to claim 1, wherein the current display interface comprises n application windows, and an nth application window comprises two or more different application interfaces.

6. The method according to claim 1, wherein the application window editing operation is a window width adjusting operation;

the current display interface further comprises width adjusting controls separately configured between every two adjacent the application windows, wherein the width adjusting control is configured to adjust a width of the application windows;

the window width adjusting operation is a first control operation for any one of the width adjusting controls; and the adjusting an application window layout of the current display interface according to the application window editing operation and a window queue comprises:

at least adjusting the window width of the current display interface according to the first control operation and the window queue.

7. The method according to claim 6, wherein in response to determining n=3, widths of the n application windows each are d/3, wherein d denotes a width of the current display interface;

the at least adjusting the window width of the current display interface according to the first control operation and the window queue comprises at least one of the following:

stretching, in response to determining that the first control operation is to drag any one of the width adjusting controls away from the starting point direction, a width of a target application window to 2d/3, wherein an nth application window in the current display interface is pushed to a display interface subsequent to the current display interface, and the target application window is an application window, close to the starting point direction, of application windows at two ends of the width adjusting control targeted by the first control operation; or in response to determining that a first application window in the current display interface is located at a starting point of the window queue, the width adjusting control close to the starting point direction is further configured to adjust a width of an application window, away from the starting point direction, of application windows at two ends of the width adjusting control, adjusting, in response to determining that the first control operation is to drag a width adjusting control close to the starting point direction to the starting point direction, a width of a second application window in the current display interface to 2d/3, wherein the first application window is temporarily pushed out of the current display interface in the starting point direction.

8. The method according to claim 7, further comprising:

displaying, after the first application window is temporarily pushed out of the current display interface, a width adjusting control on a first vertical edge, close to the starting point direction, of the current display interface; and adjusting, in response to receiving a second control operation for the width adjusting control on the first vertical edge, a width of a second application window in the current display interface to d/3, and translating the first application window temporarily pushed out of the current display interface back to the current display interface, wherein the second control operation is to drag a width adjusting control on the first vertical edge away from the starting point direction.

9. The method according to claim 6, wherein in response to determining n=2, widths of the n application windows are d/3 or 2d/3, and the application window with the width of 2d/3 in the current display interface is close to the starting point direction, wherein d denotes a width of the current display interface;

the at least adjusting the window width of the current display interface according to the first control operation and the window queue comprises:

reducing, in response to determining that the first control operation is to drag the width adjusting control to the starting point direction and an (n+1)th application window exists, a width of an application window close to the starting point direction to d/3, translating an application window, away from the starting point direction, of the current display interface and the (n+1)th application window to the starting point direction by a width of d/3, and displaying the application window and the (n+1)th application window in the current display interface; or wherein in response to determining n=2, widths of the n application windows are d/3 and 2d/3 respectively, and an application window with the width of d/3 in the current display interface is close to the starting point direction, wherein d denotes a width of the current display interface;

the current display interface further comprises a width adjusting control configured on a second vertical edge, away from the starting point direction, of the current display interface; and the at least adjusting the window width of the current display interface according to the first control operation and the window queue comprises at least one of the following:

stretching, in response to determining that the first control operation is to drag a width adjusting control close to the starting point direction away from the starting point direction, a width of a first application window in the current display interface to 2d/3, and reducing a width of a second application window in the current display interface to d/3;

reducing, in response to determining that the first control operation is to drag a width adjusting control away from the starting point direction to the starting point direction, a width of the application window away from the starting point direction to d/3; or translating, in response to determining that an (n+1)th application window exists, the (n+1)th application window to the starting point direction by a width of d/3, and displaying the (n+1)th application window in the current display interface.

10. The method according to claim 1, wherein the application window editing operation is a window adding operation; and the adjusting an application window layout of the current display interface according to the application window editing operation and a window queue comprises:

adding a to-be-added window to the current display interface at least according to existence of a vacant window position in the current display interface, wherein the to-be-added window is an application window corresponding to the window adding operation.

11. The method according to claim 10, wherein the adding a to-be-added window to the current display interface at least according to existence of a vacant window position in the current display interface comprises:

adjusting, in response to determining that the vacant window position exists in the current display interface, a width of the to-be-added window according to a width of the vacant window position and the width of the to-be-added window, and then adding the to-be-added window to the vacant window position.

12. The method according to claim 11, wherein adjusting a width of the to-be-added window according to a width of the vacant window position and the width of the to-be-added window, and then adding the to-be-added window to the vacant window position comprise:

adding, in response to determining that the width of the to-be-added window is smaller than or equal to the width of the vacant window position, the to-be-added window to the vacant window position according to an original width; and reducing, in response to determining that a width of the to-be-added window is greater than the width of the vacant window position, a width of the to-be-added window to a width of the vacant window position, and then adding the to-be-added window to the vacant window position.

13. The method according to claim 10, wherein in response to determining n=1, a width of the application window is d/3 or 2d/3, and a width of the to-be-added window is d/3, wherein d denotes a width of the current display interface; and the adding a to-be-added window to the current display interface at least according to existence of a vacant window position in the current display interface comprises:

adding the to-be-added window to the vacant window position adjacent to an application window of an original display interface.

14. The method according to claim 10, wherein in response to determining n=2, a width of the n application windows is selected to be d/3 or 2d/3, wherein d denotes a width of the current display interface; and the adding a to-be-added window to the current display interface at least according to existence of a vacant window position in the current display interface comprises:

reducing, in response to determining that no vacant window position exists in the current display interface, a width of an application window with a width of 2d/3 in the current display interface to d/3, adding 1 to n, and adding the to-be-added window by a width of d/3 as an nth application window in the current display interface to the current display interface; and adding, in response to determining that the vacant window position exists in the current display interface, the to-be-added window to the vacant window position of an original display interface.

15. The method according to claim 10, wherein in response to determining n=3, widths of the n application windows each are d/3, wherein d denotes a width of the current display interface; and the adding a to-be-added window to the current display interface at least according to existence of a vacant window position in the current display interface comprises:

adding the to-be-added window by a width of d/3 to a position of the nth application window in the current display interface, wherein an original nth application window in the current display interface is pushed to a display interface subsequent to the current display interface.

16. The method according to claim 1, wherein the application window editing operation is a window translating operation; and the adjusting an application window layout of the current display interface according to the application window editing operation and a window queue comprises at least one of the following:

triggering an application window position adjusting button to suspend a to-be-adjusted application window above the window queue, dragging the to-be-adjusted application window to a to-be-adjusted position, and sequentially arranging original application windows backwards along the window queue in a direction opposite to the starting point direction after position determination; or dragging a to-be-adjusted application window to an edge position of the current display interface, activating another display interface adjacent to the current display interface, and conducting reordering in an application window of a new display interface.

17. A non-transitory computer-readable storage medium, storing a computer program instruction, one or more processors are collectively configured to execute the computer program instruction to:

receive an application window editing operation for the current display interface; and adjust an application window layout of the current display interface according to the application window editing operation and a window queue, wherein the window queue is configured for continuous adjacent arrangement of the n application windows, a status of the window queue is dynamically updated with change of the application window layout, serial numbers of application windows in the window queue sequentially increase in a direction opposite to a starting point direction, a serial number of an application window, closest to the starting point direction, of the n application windows is 1, and the starting point direction is a direction, close to a driver side, of the in-vehicle terminal; and at least part of a zone of the window queue overlaps a display interface of the in-vehicle terminal, so as to ensure that application windows in the window queue are displayed in the current display interface, wherein the application window editing operation is a window removing operation, and the one or more processors are collectively configured to adjust the application window layout of the current display interface by:

determining a to-be-removed window in the current display interface according to the window removing operation, removing the to-be-removed window n from the current display interface, and determining whether an (n+1)th application window exists; and in response to determining that the (n+1)th application window exists, obtaining a first width of the (n+1)th application window and a second width of the to-be-removed window, determining a translating strategy according to a comparison result of the first width and the second width, and translating, according to the translating strategy, an application window having a serial number greater than the serial number of the to-be-removed window n in the window queue sequentially to the starting point direction, and displaying the application window in the current display interface, wherein the translating strategy comprises:

in response to the first width being greater than the second width, reducing the first width of the (n+1)th application window to the second width, translating the (n+1)th application window to the starting point direction, and displaying the (n+1)th application window in the current display interface.

18. An in-vehicle terminal, comprising:

one or more processors; and a memory configured to store an instruction executable by the one or more processors, wherein the one or more processors are collectively configured to execute the executable instruction in the memory to:

receive an application window editing operation for the current display interface; and adjust an application window layout of the current display interface according to the application window editing operation and a window queue, wherein the window queue is configured for continuous adjacent arrangement of the n application windows, a status of the window queue is dynamically updated with change of the application window layout, serial numbers of application windows in the window queue sequentially increase in a direction opposite to a starting point direction, a serial number of an application window, closest to the starting point direction, of the n application windows is 1, and the starting point direction is a direction, close to a driver side, of the in-vehicle terminal; and at least part of a zone of the window queue overlaps a display interface of the in-vehicle terminal, so as to ensure that application windows in the window queue are displayed in the current display interface, wherein the application window editing operation is a window removing operation, and the one or more processors are collectively configured to adjust the application window layout of the current display interface by:

determining a to-be-removed window in the current display interface according to the window removing operation, removing the to-be-removed window n from the current display interface, and determining whether an (n+1)th application window exists; and in response to determining that the (n+1)th application window exists, obtaining a first width of the (n+1)th application window and a second width of the to-be-removed window, determining a translating strategy according to a comparison result of the first width and the second width, and translating, according to the translating strategy, an application window having a serial number greater than the serial number of the to-be-removed window n in the window queue sequentially to the starting point direction, and displaying the application window in the current display interface, wherein the translating strategy comprises:

in response to the first width being greater than the second width, reducing the first width of the (n+1)th application window to the second width, translating the (n+1)th application window to the starting point direction, and displaying the (n+1)th application window in the current display interface.

* * * * *